United States Patent [19]
Sirany

[11] Patent Number: 5,816,901
[45] Date of Patent: Oct. 6, 1998

[54] METHOD OF RESURFACING A VEHICLES'S BRAKING ROTORS AND DRUMS

[76] Inventor: Dallas R. Sirany, 5733 Dumas Ave., Minnetonka, Minn. 55345

[21] Appl. No.: 550,639

[22] Filed: Oct. 31, 1995

Related U.S. Application Data

[60] Division of Ser. No. 224,475, Apr. 7, 1994, abandoned, which is a continuation-in-part of Ser. No. 45,636, Apr. 9, 1993, abandoned.

[51] Int. Cl.$^6$ ............................... B24B 1/00; B24B 23/02
[52] U.S. Cl. ............................. 451/415; 451/61; 451/63; 451/527; 451/902
[58] Field of Search .................................. 451/51, 61, 63, 451/312, 434, 439, 902, 527, 415, 529, 533, 538, 539; 83/162, 875; 82/112, 1.11, 901; 407/65, 115, 116

[56] References Cited

U.S. PATENT DOCUMENTS

| | | |
|---|---|---|
| 2,772,095 | 11/1956 | Barnes . |
| 3,521,411 | 7/1970 | Hennig et al. . |
| 3,613,318 | 10/1971 | Gianatasio ............................. 451/415 |
| 3,823,627 | 7/1974 | Scharfen . |
| 4,086,732 | 5/1978 | Ramsey . |
| 4,156,479 | 5/1979 | Kawamura . |
| 4,202,140 | 5/1980 | Alessio .................................... 451/527 |
| 4,269,002 | 5/1981 | Venere et al. . |
| 4,336,730 | 6/1982 | Kopecko et al. . |
| 4,361,988 | 12/1982 | Gramlich . |
| 4,493,231 | 1/1985 | Wossner . |
| 4,682,446 | 7/1987 | Woodall et al. ..................... 451/527 X |
| 4,854,199 | 8/1989 | Norman . |
| 5,056,266 | 10/1991 | Norris . |
| 5,099,728 | 3/1992 | Thiem . |
| 5,155,944 | 10/1992 | Nagel et al. . |

FOREIGN PATENT DOCUMENTS

| | | | |
|---|---|---|---|
| 2514853 | 10/1976 | Germany | .............................. 451/527 |
| 975375 | 11/1982 | U.S.S.R. | ................................ 451/527 |

OTHER PUBLICATIONS

Erik Oberg, et al., *Machinery's Handbook*, Industrial Press Inc., 23rd Ed., 1990, pp. 704–705.

Wolfgang Kreitlow, et al., "Vibration and Hum of Disc Brakes Under Load", SAE Technical Paper Series #850079, 1985.

*Primary Examiner*—Joseph M. Gorski
*Attorney, Agent, or Firm*—Merchant, Gould, Smith, Edell, Welter & Schmidt, P.A.

[57] ABSTRACT

A method and apparatus for preventing lateral movement of a movable brake member of a brake assembly when in engagement with a rotatable brake member having a braking surface. The method includes creating a plurality of grooves in the braking surface. Each groove is parallel to adjacent grooves so that peaks are formed on a movable brake member which mirror the plurality of grooves. The peaks track within the grooves to prevent lateral movement of the movable brake member with respect to the braking surface. The apparatus includes a brake resurfacer for resurfacing a braking surface of a vehicle brake assembly while the braking surface is mounted to a vehicle. The resurfacer includes a substrate figured for mounting in the brake assembly in place of a movable brake member. The substrate supports cutting teeth, tines or an abrasive for removing braking surface material to resurface the braking surface. Alternatively, the cutting teeth, tines or abrasive are supported by a backing having a pressure sensitive adhesive which releasably couples the backing upon an existing or new brake pad or brake shoe of the brake assembly.

8 Claims, 11 Drawing Sheets

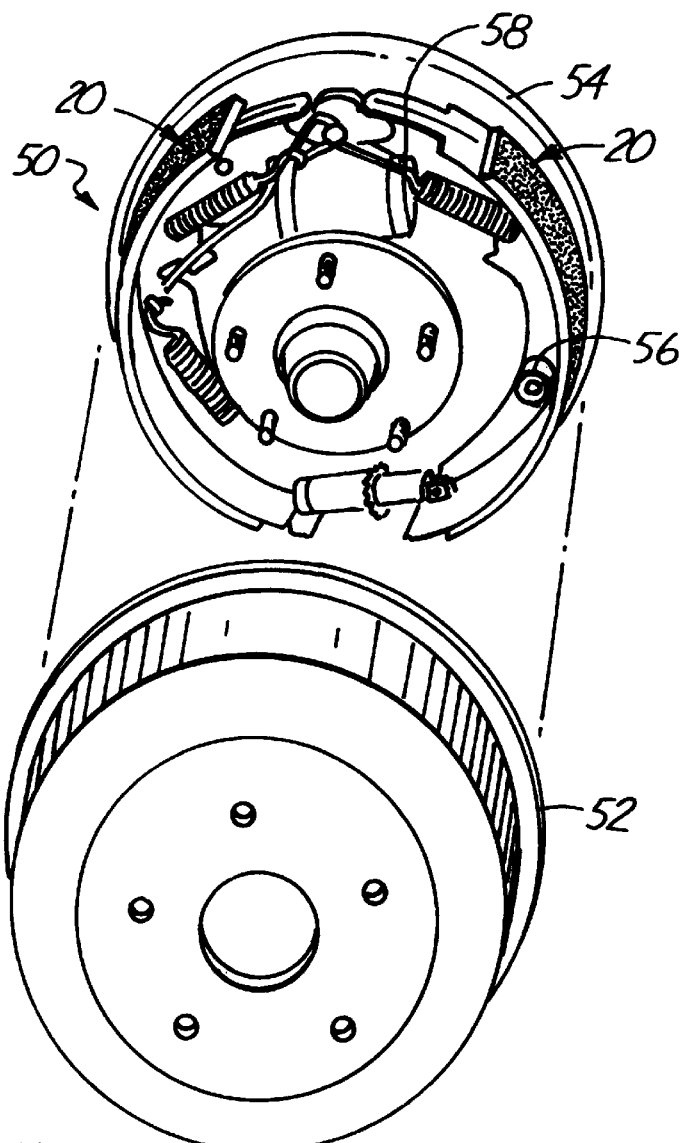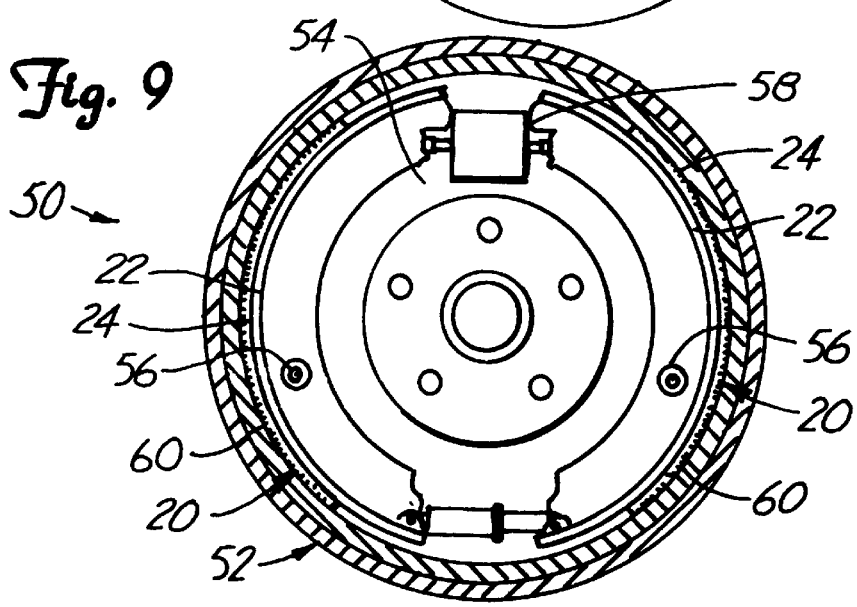

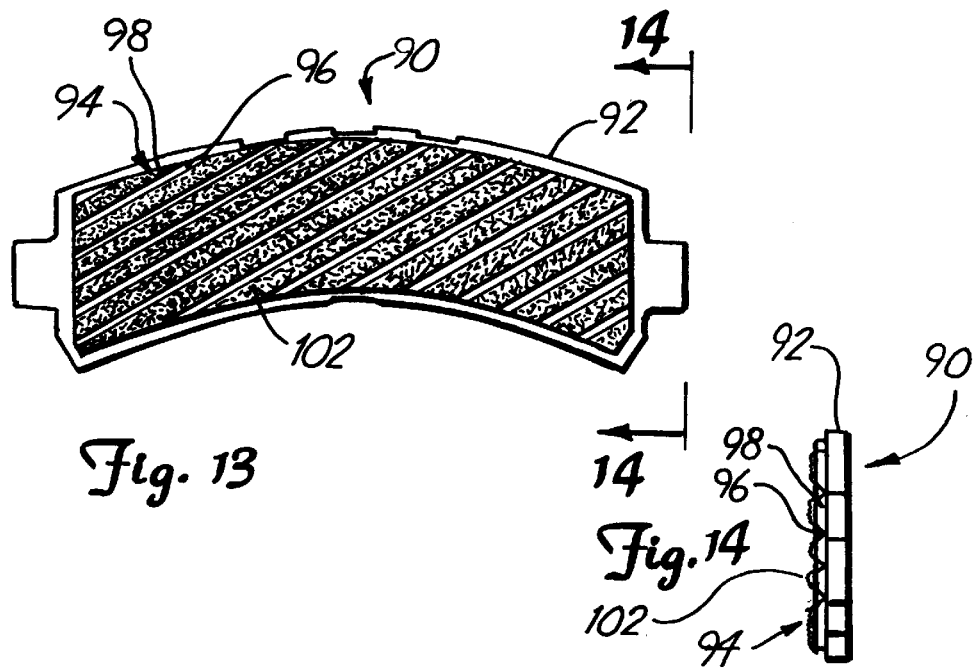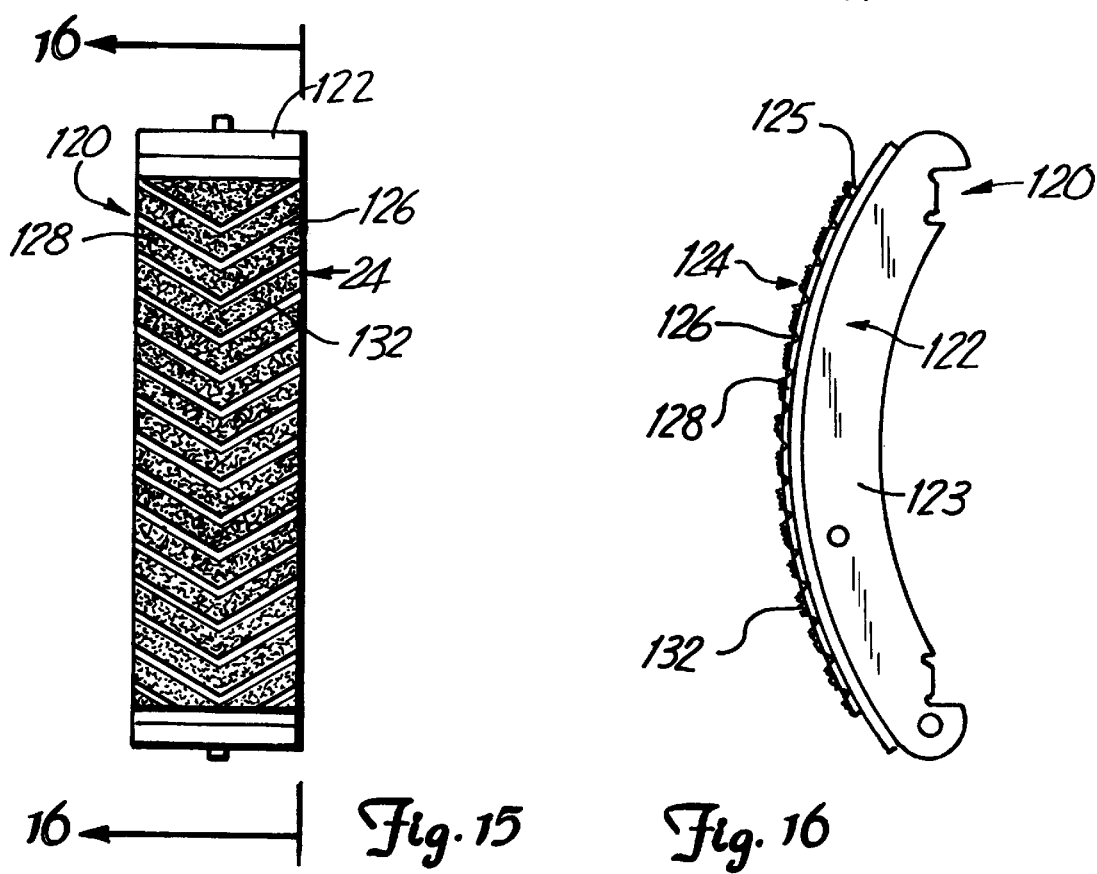

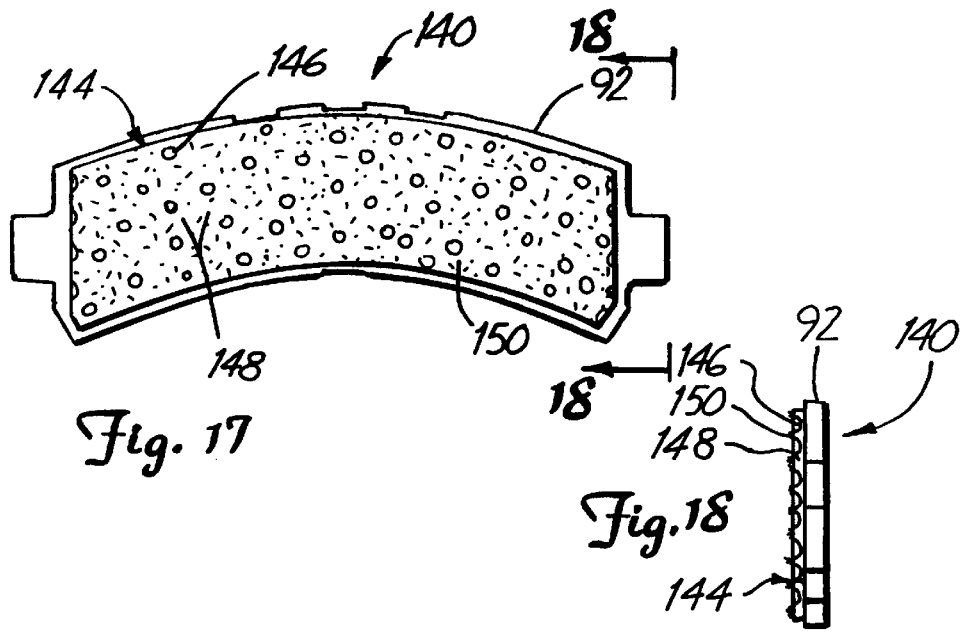
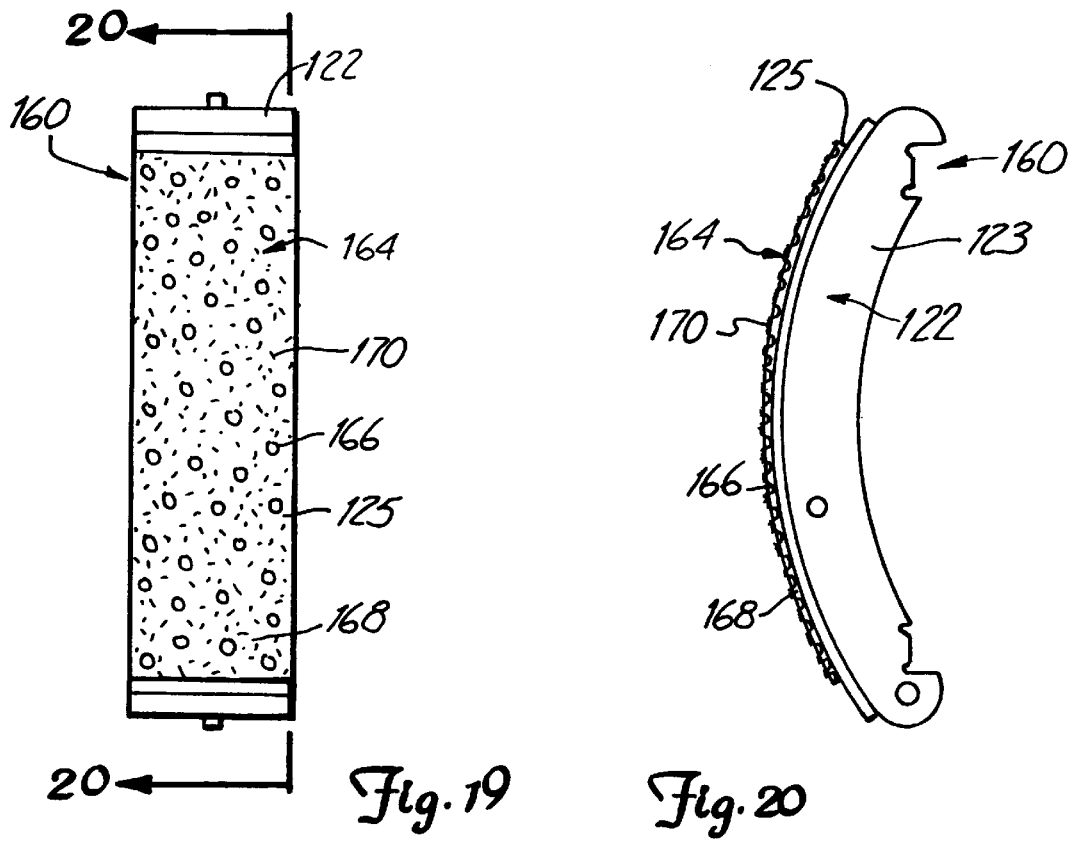

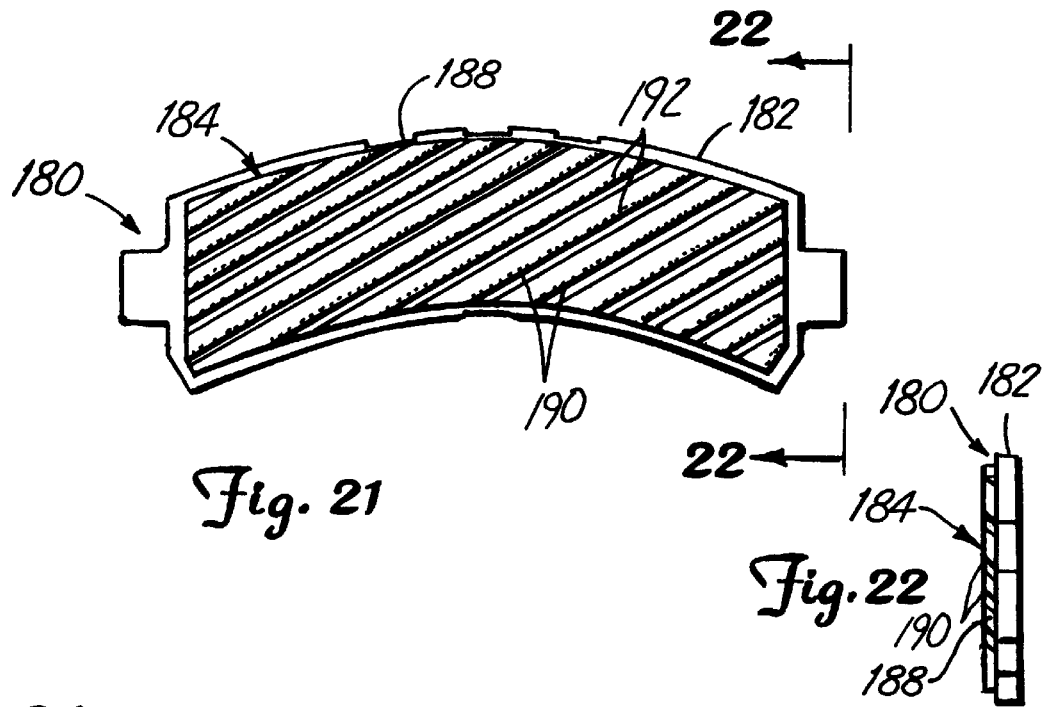
Fig. 21
Fig. 22
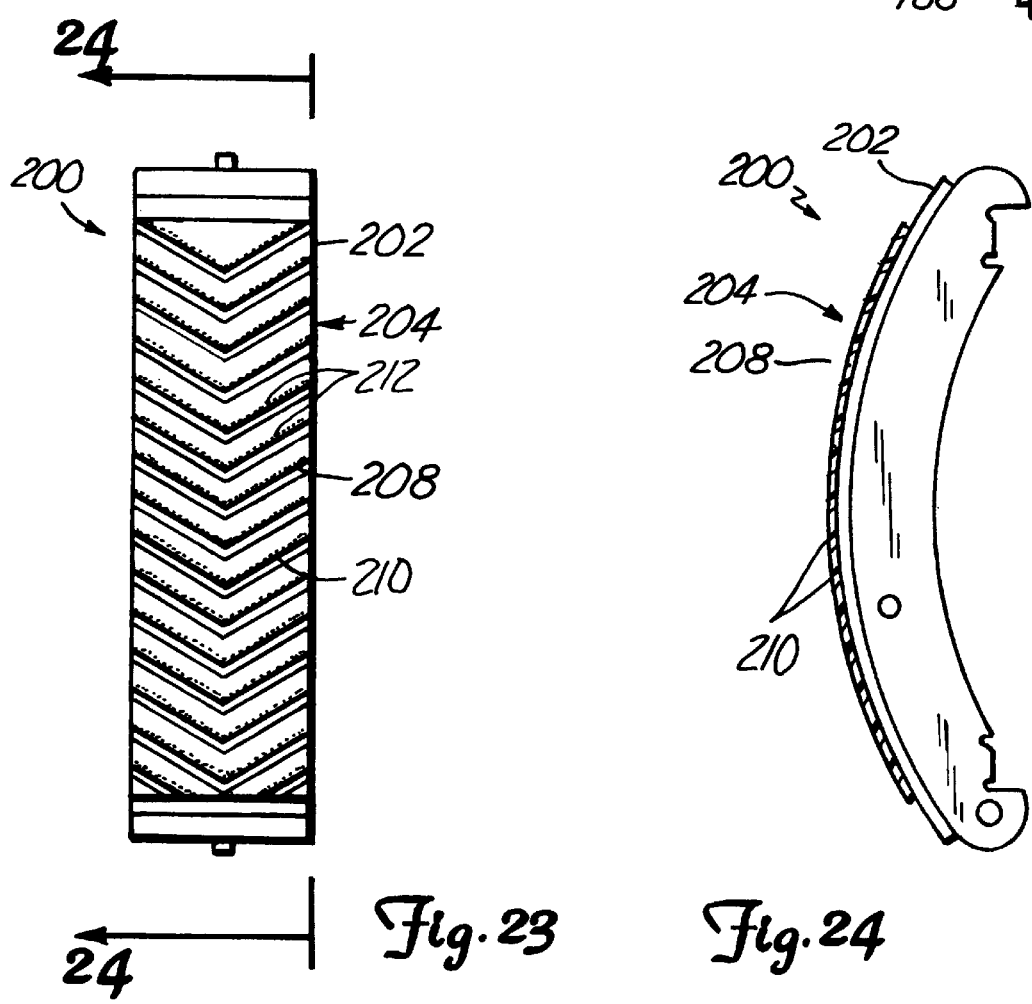
Fig. 23
Fig. 24

METHOD OF RESURFACING A VEHICLES'S BRAKING ROTORS AND DRUMS

This is a divisional of application Ser. No. 08/224,475, filed Apr. 7, 1994 and now abandoned, which is a Continuation-in-Part of application Ser. No. 08/045,636, filed Apr. 9, 1993, now abandoned, which application(s) are incorporated herein by reference.

BACKGROUND OF THE INVENTION

The present invention relates to brake resurfacers. In particular, the invention relates to a method and apparatus for resurfacing a braking surface of a vehicle brake rotor or drum while the brake rotor or drum is mounted to the vehicle.

Brake rotors and drums provide braking surfaces against which brake pads and brake shoes, respectively, frictionally engage to brake a vehicle. Ideally, brake rotors should rotate perpendicularly to the established axis without tolerance. Brake drums should rotate concentrically to the established axis without tolerance. In addition, the braking surfaces of brake rotors should be parallel to the caliper brake pad locating surfaces and the face of the hydraulic plunger.

During braking, it is also important that the brake pads and brake shoes "track" perfectly on the braking surfaces of the brake rotors and brake drums, respectively, without lateral movement. Lateral movement or "skating" of the brake pads and brake shoes with respect to the braking surfaces creates undesirable vibration and noise.

In an attempt to address this problem, products and servicing procedures have been developed to stabilize the brake pad and the brake shoe with respect to the caliper bracket and the back plate, respectively. One such servicing procedure involves applying a liquid adhesive to the back of the brake pad. The adhesive then solidifies between the brake pad backing plate and the caliper bracket to minimize lateral movement of the brake pads.

In another attempt to solve the skating problem, an adhesive backed aluminum sheet is secured between backing plates of the braking pads and the caliper brackets. The aluminum sheets provide a soft surface in which depressions outlining the shape of the caliper brackets form. The depressions minimize movement and stabilize the brake pads. Both attempts to solve the skating problem lose their effectiveness over time as the adhesives and the depressions break down or wear away. Moreover, both attempted solutions require additional servicing procedures and products which are time consuming and costly.

Excessive wear during use of the vehicle causes the braking surface of brake rotors and drums to wear unevenly, and generates heat, causing warping in the braking surface. As a result, brake rotors and drums do not rotate perpendicularly and concentrically, respectively, to the established axis. These errors, or tolerances, are known as run out, flatness, parallelism and perpendicularity. They are the source of many objectionable problems.

In such cases, the braking surface must be resurfaced or, if beyond specified tolerances, replaced. Previously, resurfacing of the brake rotor has been accomplished with a lathe-type resurfacing tool. With a lathe-type resurfacing tool, cutter blades are moved laterally across the rotating braking surface to cut off a thin layer of the braking surface and expose a generally smooth, renewed braking surface. The renewed braking surface typically has a surface finish of about 40–80 microfinish and includes microscopic, non-concentric grooves. As the cutter blades move laterally across the rotating braking surface, the microscopic grooves are created in the braking surface. These grooves form a lead angle created by the laterally moving cutter blade. As a whole, the series of grooves interconnected by the lead angle spiral towards the center of the brake rotor or the inner edge of the brake drum.

Lathe resurfacing tools are expensive and require careful adjustment. Even a slight misadjustment of the cutter head can cause damage to the braking surface of the rotor or drum. Furthermore, the extreme pressure created by engaging the very small surface of the cutter head against the braking surface requires very heavy duty ways and bracing. In addition, this device may require multiple passes across the braking surface with the cutter blade to remove a layer of sufficient thickness so as to achieve a smooth braking surface. As a result, a standard cutting thickness is normally chosen to reduce the number of passes across the braking surface. Although time is saved by decreasing the number of passes required to achieve a smooth braking surface, the standard cutting depth is often excessive, reducing the life span of the rotor or drum.

To solve some of these problems, a grinder resurfacing tool has been used to resurface the braking surface of a vehicle brake rotor. These devices employ grinding stones or chocks which are formed from multiple layers of abrasive particles bonded together. As the stones contact the braking surface, layers of the abrasive particles as well as the removed braking surface material flake away to expose new layers of abrasive particles. Because abrasive particles flake away with the removed braking surface material, removed braking surface material does not plug the grinding surface. As a result, the grinding stones are capable of resurfacing multiple braking surfaces.

Furthermore, because it is believed that a smooth, polished braking surface is desirable to prevent excessive wear of the brake pad or brake shoe and to prolong useful life of each brake pad and brake shoe, the grinding stones are designed to create a smooth, polished braking surface. Because the abrasive particles or grits on each layer are randomly positioned with respect to abrasive particles on adjacent layers, any peaks created in the braking surface by one layer of abrasive particles will be cut away by the next exposed adjacent layer of abrasive particles to establish a generally smooth, polished braking surface. However, because new abrasive material or new layers of abrasive particles are continually exposed, the grinding stones also create an ever changing uncontrollable polished surface condition on the braking surface. Consequently, any grooves created in the surface are deminimus and are not generally concentric. The grinding stones are typically mounted in an independent rotational device so as to polish off the worn surface as both the brake rotor and the grinding stones rotate relative to each other about dissimilar axes of rotation.

Previously, the braking surface of brake rotors and brake drums has been resurfaced on independent resurfacing devices using either cutting blades or grinding stones. With independent resurfacing devices, the brake rotor or drum must be dismounted from the vehicle to resurface the braking surface of the brake rotor. Such procedures involve disassembling the rotor or the drum; securing the rotor or drum to an independent resurfacing device such as a turning machine; machining or resurfacing the braking surface; and reassembling the rotor or drum to the vehicle. This procedure is time-consuming, costly and requires great skill and expertise. As a result, many vehicle owners put off necessary brake resurfacing because of the cost and the inconvenience of having their vehicle tied up during brake resurfacing.

Moreover, these methods do not entirely achieve a preferred end result. Because the rotor or drum must be disassembled from its original assembly to be placed upon an independent machine, the rotor or drum will not be returned to its identical position upon reassembly. Upon reassembly of the rotors and drums, any accumulated errors or misalignment causes vibration and other objectionable results.

To reduce some of the time required for brake resurfacing and to improve resurfacing results, brake resurfacing devices have been adapted to resurface brake rotors without removing the rotors from the vehicle. Typically, the device is mounted to the wheel hub, wheel shaft, or any other convenient member of the vehicle. The cutting blade or the grinding stone of the mounted resurfacer is typically supported by the mounted resurfacing device itself. The resurfacing device positions and aligns either the cutting blades or the grinding stones against the braking surface of the rotor or drum to resurface the braking surface. As a result, brake resurfacing accuracy is dependent upon proper mounting of the resurfacing device. To properly mount the resurfacing device requires careful adjustment. Such adjustment is time consuming and costly.

With both independent and mounted resurfacing devices, the cutter blades or the grinding stones are carried or supported by the device itself. In addition, the device itself positions the cutting blades or the grinding stones against the rotor or drum surface to be resurfaced. Because the device itself supports and positions either the cutting blades or the grinder stones against the braking surface, this device requires exacting alignment and adjustment to insure that the braking surface is resurfaced correctly to minimize or eliminate error or tolerance. This alignment is often time consuming, costly and prone to mechanic error.

Moreover, despite careful adjustment, both devices still result in imperfect brake resurfacing. Because both the independent and mounted resurfacing devices position the cutting blades or the grinder stones against the rotor or drum braking surface, the particular idiosyncracies of the devices are machined into the braking surface of the rotor or drum. These idiosyncracies, otherwise known as composite errors, include accumulated manufacturing tolerances and wear upon the resurfacing devices over time. These composite errors, which are machined into the braking surface, prevent rotor surfaces from being parallel to the caliper brake pad locating surfaces and the face of the hydraulic plunger and also prevent brake drums from rotating concentrically to the established axis without tolerance.

Cost is another major disadvantage to these methods for resurfacing braking surfaces. Both methods require expensive independent or mounted resurfacing devices.

SUMMARY OF THE INVENTION

The present invention is an improved brake surfacing or resurfacing tool. The brake resurfacer tool for resurfacing a braking surface of a vehicle brake assembly while the braking surface is mounted to a vehicle includes a substrate configured for mounting in the brake assembly in place of a movable brake member. The substrate supports cutting teeth, tines or an abrasive for removing braking surface material to resurface the braking surface. In one embodiment, concentric and parallel grooves are created in the braking surface by the brake resurfacing tool.

In another embodiment, an abrasive material is coupled to a backing. The backing is configured for being releasably secured to an existing or new brake pad or shoe of the brake assembly.

BRIEF DESCRIPTION OF THE DRAWINGS

FIG. 8 is an exploded perspective view of the brake resurfacer of FIGS. 3 and 4 mounted to a drum brake assembly.

FIG. 9 is a cross-sectional view of the resurfacer and drum brake assembly of FIG. 8.

FIG. 13 is a front elevational view of second embodiment of the brake resurfacer of FIG. 1.

FIG. 14 is a side elevational view of the brake resurfacer of FIG. 13.

FIG. 15 is a front elevational view of a second embodiment of the brake resurfacer of FIG. 3.

FIG. 16 is a side elevational view of the brake resurfacer of FIG. 15.

FIG. 17 is a front elevational view of an alternate embodiment of the brake resurfacer of FIG. 13.

FIG. 18 is a side elevational view of the brake resurfacer of FIG. 17.

FIG. 19 is a front elevational view of an alternate embodiment of the brake resurfacer of FIG. 15.

FIG. 20 is a side elevational view of the brake resurfacer of FIG. 19.

FIG. 21 is a front elevational view of an alternate embodiment of the brake resurfacer of FIG. 1.

FIG. 22 is a side elevational view of the brake resurfacer of FIG. 21.

FIG. 23 is a front elevational view of an alternate embodiment of the brake resurfacer of FIG. 3.

FIG. 24 is a side elevational view of the brake resurfacer of FIG. 23.

DETAILED DESCRIPTION OF THE PREFERRED EMBODIMENTS

Figure 1:
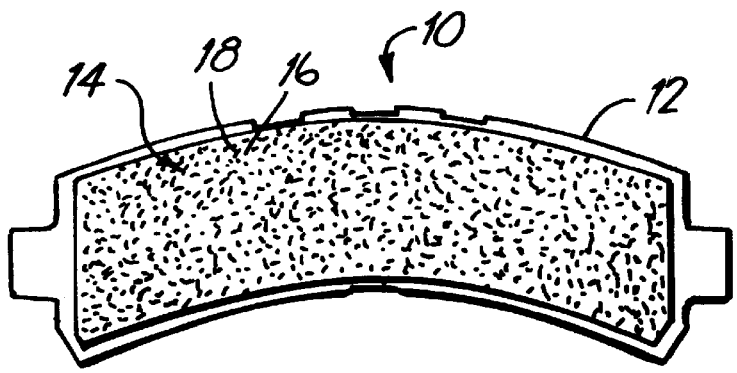
FIG. 1 is a front elevational view of a brake resurfacer for resurfacing a braking surface of a brake rotor.
Figure 2:
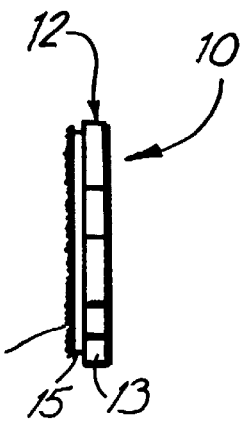
FIG. 2 is a side elevational view of the brake resurfacer of FIG. 1.

FIGS. 1 and 2 show a brake resurfacer 10 for resurfacing a braking surface of a brake rotor. FIG. 1 shows a front elevational view of resurfacer 10. FIG. 2 shows the side elevational view of resurfacer 10. Resurfacer 10 includes a generally flat, curved substrate 12 having an abrasive surface 14. Substrate 12 preferably comprises an incompressible spacing material. Alternatively, substrate 12 may consist in part of a material which compresses as brake pressure is applied during resurfacing. Substrate 12 includes support member 13 and backing 15. Support member 13 of substrate 12 is configured for mounting in a brake assembly in place of a movable brake member such as the brake pad. Support member 13 of substrate 12 preferably comprises a brake pad. As can be appreciated, support member 13 may actually consist of the existing brake pad of the vehicle wherein backing 15 and abrasive surface 14 are mounted upon the existing brake pad for resurfacing of the brake rotor.

Backing 15 consists of a thin supporting material having an outer surface paralleling the outer surface of support member 13. Backing 15 underlies abrasive surface 14. Backing 15 preferably consists of a cloth or rigid fiber backing. Alternatively, other materials for backing 15 may be used. The front face of backing 15 is coated with bonding agent 16 and abrasive material 18 which form abrasive surface 14. The back face of backing 15 is preferably fixedly secured to support member 13 of substrate 12 by a pressure sensitive adhesive which has high shear strength and low pull strength. As a result, backing 15 with abrasive surface 14 may also be directly secured to the existing brake pad or new brake pad in lieu of support member 13. After resurfacing is complete, backing 15 with abrasive surface 14 may be easily pulled off the brake pad. Consequently, the existing brake pad or new brake pad may be used instead of support member 13 and even left in place during resurfacing to reduce the time and cost of resurfacing. Alternatively, other known attachment methods may be used to secure backing 15 to support member 13.

Abrasive surface 14 is a single or thin exposed layer of abrasive particles and substantially covers a front face of substrate 12. Abrasive surface 14 is fixedly coupled to substrate 12 so as to remain coupled to substrate 22 during resurfacing. Abrasive surface 14 comprises abrasive material 18 including ceramics, silicates, silicon carbides, aluminum oxides, cubic boron nitride, diamond, synthetic diamond, carbides or a mixture thereof bonded together by bonding agent 16. Abrasive surface 14 preferably includes a mixture of ceramics and aluminum oxides. Because abrasive surface 14 is a single layer of abrasive particles permanently coupled to substrate 22, abrasive surface 14 performs similarly to single surface containing multiple individual cutting tools or points. As a result, abrasive surface 14 creates corresponding peaks and valleys or grooves in the braking surface during resurfacing. Abrasive surface 14 preferably has a grade sufficient so as to produce a surface condition of concentric annular grooves having a depth of between about 150 micro-inches to about 1000 micro-inches (i.e, a microfinish of between about 150 to about 1000 as measured by a profillometer moving perpendicular to the grooves). Preferably, abrasive surface 14 produces concentric annular grooves having a depth of about 150 micro-inches to about 400 micro-inches and is durable so as to be capable of removing up to about 0.125 inches of brake surface material. Abrasive surface 14 also preferably creates a surface finish on the flanks or sides of each groove from between about 80 microfinish to about 150 microfinish (as measured by a profillometer moving parallel to the grooves). The lower, smoother microfinish of the flanks of the grooves reduces wear on the brake pads and prolongs the useful life of the brake pads.

Bonding agent 16 preferably is capable of withstanding temperatures from 0° to 1200° Fahrenheit. At minimum, bonding agent 16 should be able to withstand temperatures from about room temperature to about 500° Fahrenheit without pulling. In addition, bonding agent 16 is preferably capable of withstanding metal removal forces from about 150 lbs. to about 3500 lbs. At minimum, bonding agent 16 should be able withstand metal removal forces from about 150 lbs. to about 1000 lbs. Bonding agent 16 preferably comprises a resin. As can be appreciated, bonding agent 16 and abrasive material 18 may be directly affixed to a surface of support member 13 of substrate 12 in lieu of backing 15.

Figure 3:
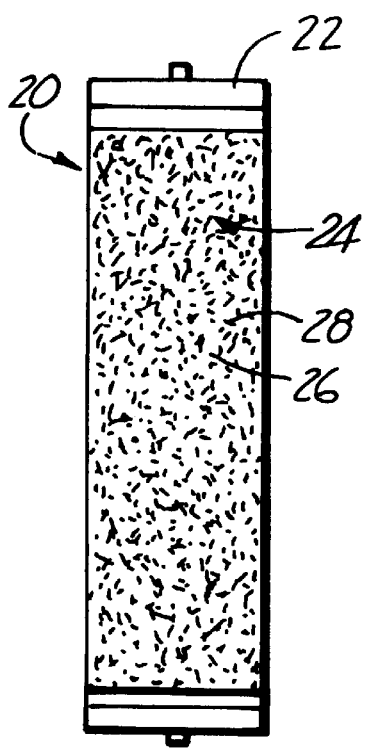
FIG. 3 is a front elevational view of a brake resurfacer for resurfacing a braking surface of a brake drum.
Figure 4:
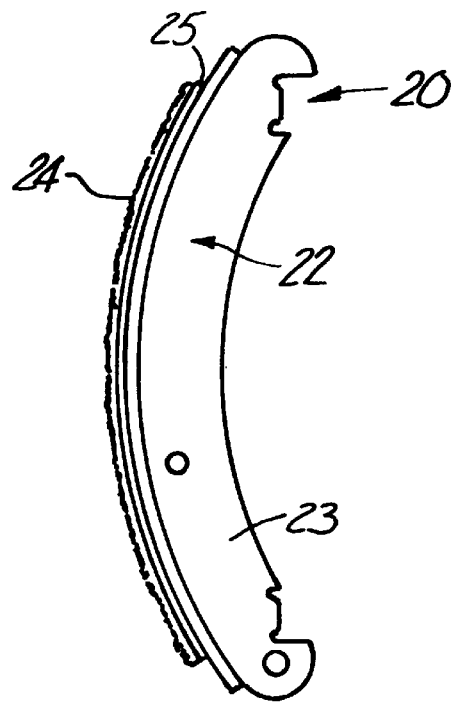
FIG. 4 is a side elevational view of the brake resurfacer of FIG. 3.

FIGS. 3 and 4 show a brake resurfacer 20 for resurfacing a braking surface of a brake drum. FIG. 3 shows a front elevational view of resurfacer 20. FIG. 4 shows a side elevational view of resurfacer 20. Resurfacer 20 includes arcuate substrate 22 having abrasive surface 24. Substrate 22 preferably comprises an incompressible spacing material. Alternatively, substrate 22 may consist in part of a material which compresses as brake pressure is applied during resurfacing. Substrate 22 includes support member 23 and backing 25. Support member 23 of substrate 22 is configured for mounting in a brake assembly in place of a movable brake member such as a brake shoe. Support member 23 of substrate 22 preferably comprises a brake shoe. As can be appreciated, support member 23 may consist of the existing brake shoe of the vehicle wherein backing 25 and abrasive surface 24 are mounted upon the existing brake shoe to resurface the brake drum.

Backing 25 consists of a thin supporting material having an outer surface paralleling the outer surface of support member 23. Backing 25 underlies abrasive surface 24. Backing 25 preferably consists of a cloth or rigid fiber board backing. Alternatively, other materials for backing 25 may be used. The front face of back 25 is coated with bonding agent 26 and abrasive material 28 which form abrasive surface 24. The back face of backing 25 is fixedly secured to support member 23 of substrate 22 by a pressure sensitive adhesive which has high shear strength and low pull strength. As a result, backing with abrasive surface 24 may also be directly secured to the existing brake shoe or new brake shoe in lieu of support member 23. After resurfacing is complete, backing 25 with abrasive surface 24 may be easily pulled off the brake shoe. Consequently, the existing brake shoe or new brake shoe may be used instead of support member 23 and even left in place during resurfacing to reduce the time and cost of resurfacing. Alternatively, other known attachment methods may be used to secure backing 25 to support member 23.

Abrasive surface 24 is a single or thin exposed layer of abrasive particles and substantially covers an arcuate surface of substrate 22. Abrasive surface 24 is fixedly coupled to substrate 22 so as to remain coupled to substrate 22 during resurfacing. Abrasive surface 24 has abrasive including ceramics, silicates, silicon carbides, aluminum oxides, carbides, diamond, synthetic diamond, cubic boron nitride or a mixture thereof bonded together by bonding agent 26.

Alternatively, abrasive surface 24 includes a mixture of ceramics and aluminum oxides. Preferably, abrasive surface 24 includes diamond or a mixture of abrasive minerals. Because abrasive surface 24 is a single layer of abrasive particles permanently coupled to substrate 22, abrasive surface 24 performs similarly to single surface containing multiple individual cutting tools or points. As a result, abrasive surface 24 creates corresponding peaks and valleys or grooves in the braking surface during resurfacing. Abrasive surface 24 preferably has a grade sufficient so as to produce a surface condition of concentric annular grooves having a depth of about 150 micro-inches to about 1000 micro-inches (i.e., a microfinish of between about 150 to about 1000 as measured by a profillometer being moved perpendicular to the grooves). Preferably, abrasive surface 24 produces concentric annular grooves having a depth of about 150 micro-inches to about 400 micro-inches and is durable so as to be capable of removing up to about 0.125 inches of brake surface material. Abrasive surface 24 also preferably creates a surface finish on the flanks or sides of each groove from between about 80 microfinish to about 150 microfinish (as measured by a profillometer moving parallel to the grooves). The lower, smoother microfinish of the flanks of the grooves reduces wear on the brake pads and prolongs the useful life of the brake pads.

Bonding agent 26 is preferably capable of withstanding temperatures from about 0° to about 1200°. Preferably, bonding agent 26 withstands temperatures of about room temperature to about 500° without pulling. In addition, bonding agent 26 preferably should be capable of withstanding metal removal forces from about 150 lbs. to about 3500 lbs. At minimum, bonding agent 26 should withstand metal removal forces from about 150 lbs to about 1000 lbs. Bonding agent 26 preferably comprises a resin. As can be appreciated, bonding agent 26 and abrasive material 28 may be directly affixed to support member 23 of substrate 22 in lieu of backing 25.

Figure 5:
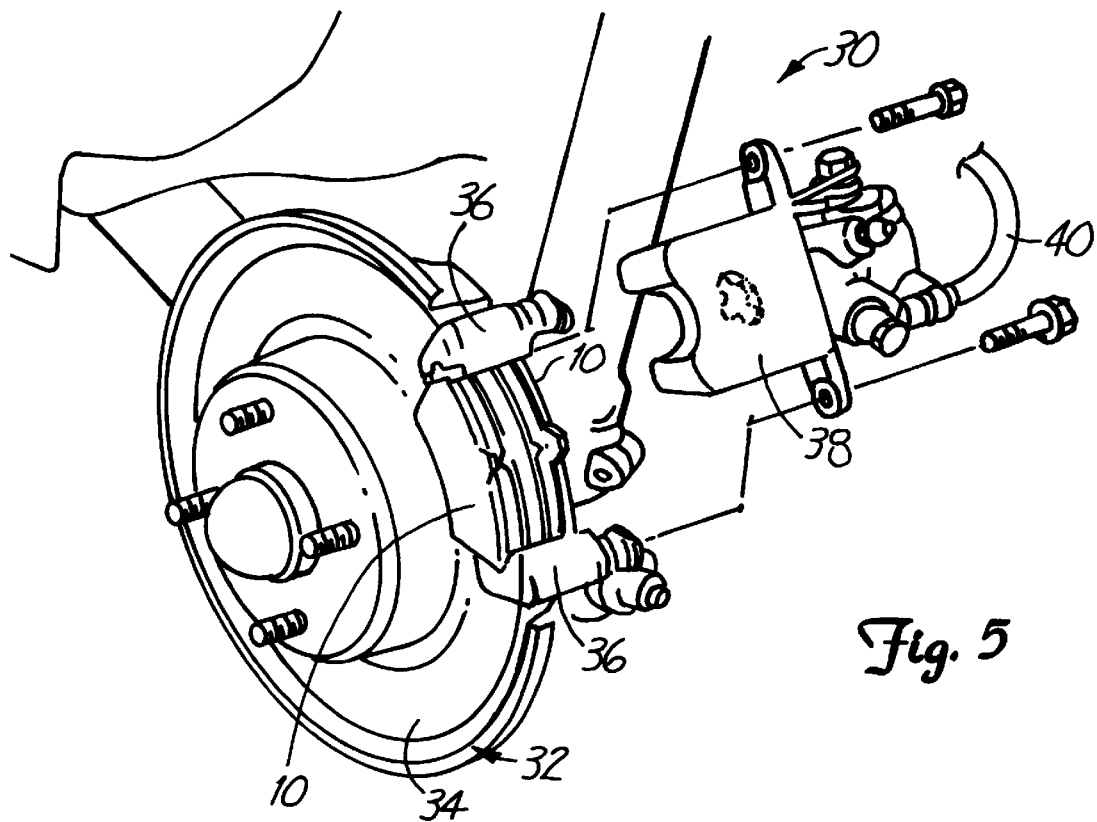
FIG. 5 is an exploded perspective view of the brake resurfacer of FIGS. 1 and 2 mounted to a disk brake assembly.

FIG. 5 shows a pair of resurfacers 10 mounted to a vehicle disk brake assembly 30. Disk brake assembly 30 is well known in the art and includes rotor 32 having braking surface 34, caliper brackets 36, caliper housing 38 and brake line 40. All components of disk brake assembly 30 are well known in the art. As known in the art, rotor 32 is connected to a wheel on which is mounted a tire (not shown). Caliper brackets 36 are configured for mounting and supporting a movable brake member, typically a brake pad (not shown). Caliper housing 38 defines locating surfaces upon which the brake pad is supported. Disk brake assembly 30 brakes the wheels of the motor vehicle by causing the brake pad (not shown) to frictionally engage braking surface 34 of rotor 32 as pressure is applied through brake line 40.

As shown by FIG. 5, resurfacers. 10 are configured for mounting to caliper brackets 36 in place of each brake pad. Resurfacers 10 are mounted to caliper brackets 36 in place of the two brake pads (not shown). Because resurfacers 10 are configured for mounting to caliper brackets 36 in place of each brake pad, braking surface 34 can be resurfaced without rotor 32 being dismounted from the vehicle. Consequently, less time and less expertise is required to resurface braking surface 34 of rotor 32. In addition, expensive independent and mounted resurfacing devices are not required to resurface braking surface 34. Because braking surface 34 of rotor 32 can be resurfaced in less time, at a lower cost, and with very little expertise, necessary brake resurfacing will more likely be performed.

Figure 6:
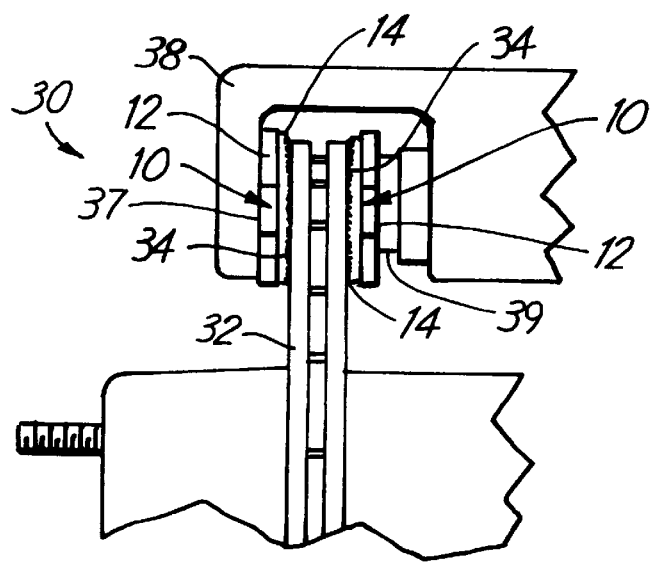
FIG. 6 is an enlarged fragmentary side view of the brake resurfacer and disk brake assembly of FIG. 5.

FIG. 6 shows abrasive surfaces 14 of resurfacers 10 contacting braking surfaces 34 of rotors 32 to resurface braking surfaces 34. As shown by FIG. 6, caliper housing 38 includes caliper brake pad locating surface 37 and hydraulic plunger 39. Resurfacers 10 are mounted so that each abrasive surface 14 faces braking surface 34 of rotor 32. As pressure is applied to the vehicle's brakes, caliper brackets 36, caliper brake pad locating surface 37 and hydraulic plunger 39 position resurfacers 10 against rotor 32. As a result, abrasive surfaces 14 of resurfacers 10 are brought into contact with braking surfaces 34 of rotor 32. Rotor 32 is rotated about an axis established by the vehicle's own spindle bearing. In addition, abrasive surfaces 14 of resurfacers 10 are held stationary as abrasive surfaces 14 contact braking surfaces 34. As a result, idiosyncrasies, such as those present with independent and mounted resurfacing devices, are not machined into braking surfaces 34 of rotor 32.

Caliper brackets 36 and caliper housing 38 of vehicle disk brake assembly 30 position resurfacers 10 against and in contact with braking surface 34 of rotors 32 to resurface braking surface 34. Because resurfacers 10 are mounted to caliper brackets 36 and to caliper housing 38 in place of the brake pads, resurfacers 10 have substantially the same orientation and alignment as the original brake pads. The orientation and alignment of resurfacers 10 is based upon caliper brake pad locating surface 37 and upon the face and centerline of the applied forces of hydraulic plunger 39. Consequently, braking surface 34 is resurfaced so as to be parallel to caliper brake pad locating surface 37 and the face of hydraulic plunger 39. As a result, little or no alignment or adjustment is required to ensure that resurfacers 10 resurface braking surface 34 with the proper orientation and alignment, thereby producing the ideal end result for trouble free brake operation.

Figure 11:
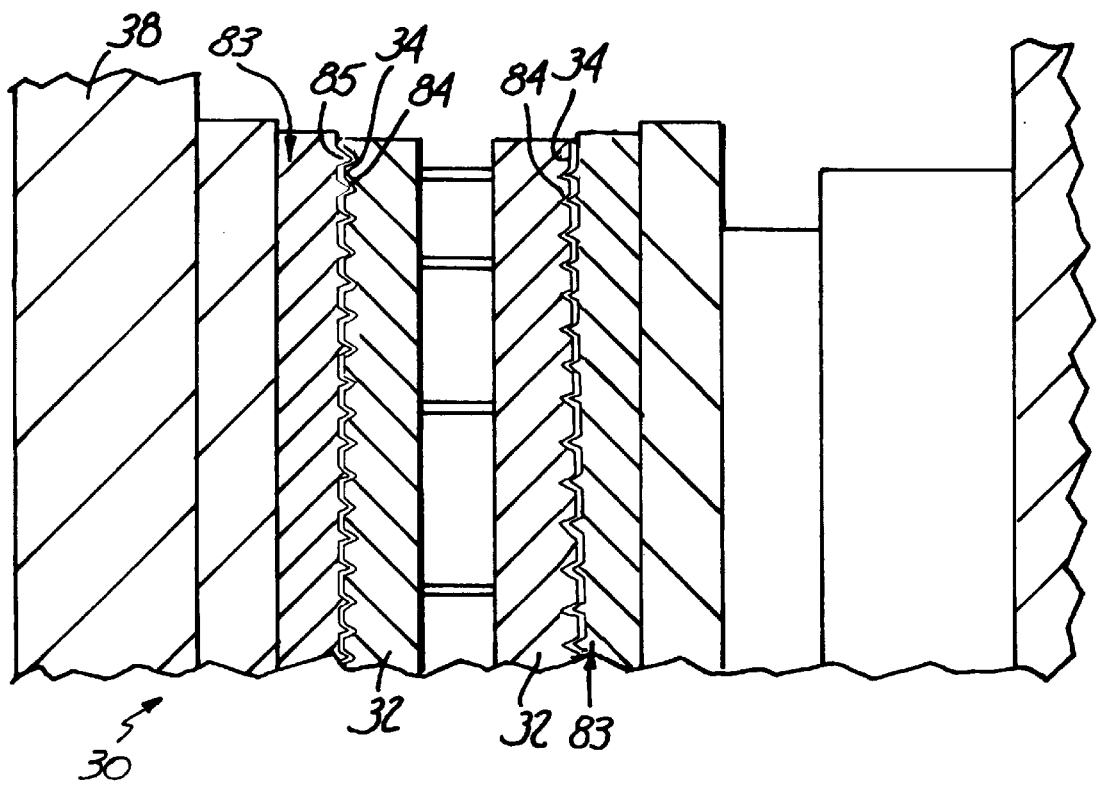
FIG. 11 is an enlarged fragmentary elevational view of a portion of the disk brake assembly of FIG. 6 including a brake pad.

FIG. 11 is a greatly enlarged fragmentary view of a portion of FIG. 6 showing brake pads 83 repositioned in place of the resurfacers 10 after braking surface 34 has been resurfaced. It has been discovered that creating concentric or parallel grooves in the braking surface minimizes or eliminates lateral movement of the brake pad or brake shoe with respect to the braking surface, thereby reducing or eliminating vibration and noise. As best shown by FIG. 11, the resurfacing of braking surface 34 by resurfacer 10 (shown in FIGS. 5 and 6) creates a series of circular grooves 84 in braking surface 34 which are concentric, without tolerance, to the axis of rotation of rotor 32. Each groove 84 has perfect concentricity with respect to adjacent grooves across braking surface 34. Because resurfacers 10 (shown in FIG. 6) remain substantially stationary during the rotation of rotor 32 and the resurfacing of braking surface 34, and because the same single layer of abrasive particles resurfaces or cuts into the braking surface during each revolution of the braking surface, resurfacers 10 create perfectly concentric grooves 84 about the axis of rotation of rotor 32.

The perfectly concentric pattern of circular grooves 84 on braking surface 34 of rotor 32 causes brake pads 83 to wear in, mirroring braking surface 34. As a result, peaks 85 form along brake pad 83. Peaks 85 correspond to and perfectly match grooves 84 of braking surface 34. The perfectly matched peaks 85 and grooves 84 cause brake pad 83 to track perfectly upon braking surface 34 of rotor 32 without lateral movement or skating. Consequently, the use of resurfacer 10 ultimately results in less vibration and noise during brake operation without additional servicing procedures or products. As can be appreciated, increasing the grade of abrasive surface 14 increases the depth of each groove 84. By increasing the depth of each groove 84, the trackability of brake pad 83 upon braking surface 34 is further increased.

In contrast, the lathe-type resurfacers create non-concentric grooves. The non-concentric grooves created by the lathe-type resurfacers have lead angles between the grooves which shave off any peaks formed in the brake pad. In addition, the lathe-type resurfacers produce too smooth of a surface finish (approximately 40–80 microfinish) for effective tracking of the brake pad. Because any peaks formed on the brake pad are shaved away, the brake pad additionally and progressively polishes the braking surface. Thus, operation of brakes which have been resurfaced with traditional lathe-type resurfacers encounter vibration and noise.

Similarly, the use of rotating grinding stones creates non-concentric grooves with respect to the axis of rotation of the braking surface. As with the grooves created by lathe resurfacers, any grooves created by rotating grinding stones also shave off any peaks which may be formed in the brake pads. Moreover, because the grinding stones have particles which flake away during resurfacing, any grooves created are shallow (i.e., a polished surface) and non-concentric. Thus, brakes resurfaced with rotating grinding stones also encounter vibration and noise during operation.

In addition to reducing or eliminating lateral movement or skating, grooves 84 created by resurfacer 10 also reduce braking time and reduce warping of the braking surface during brake operation. Because the flanks or sides of each groove 84 frictionally engage the flanks or sides of each corresponding peak on the braking pad, grooves 84 increase the surface area of braking surface 34 in frictional engagement with brake pad 83. Consequently, braking time is reduced. Furthermore, because braking surface 34 has a larger surface area exposed to air when not in contact with brake pad 83, braking surface 34 cools faster, thereby reducing warpage caused by excessive heat buildup. By reducing or eliminating warping of braking surface 34, grooves 84 reduce or eliminate vibration and noise. As can be appreciated, increasing the depth of grooves 84 (increasing the microfinish) increases the surface area of braking surface 34 to further shorten the time necessary for braking and to further reduce warping.

Lathe-type resurfacers and grinding stone resurfacers do not create concentric grooves having a sufficient depth (i.e., microfinish) to sufficiently increase the surface area of the braking surface. In direct contrast, lathe-type resurfacers and resurfacers employing grinding stones are both designed with the goal of creating a generally flat smooth or polished surface. The smooth or polished surface created by lathe-type resurfacers and grinding stones has a slower braking rate, does not cool as quickly and is more suspectable to warping which leads to vibration.

Resurfacers 10 permit braking surface 34 to be resurfaced without error or tolerance being introduced by misadjustment of resurfacers 10. Moreover, because disk rotors 32 are not dismounted from the vehicle and because disk brake assembly 30 positions resurfacers 10 against braking surface 34 of rotors 32, the inherent idiosyncracies of each wheel assembly establish perpendicularities and parallelisms without tolerance.

Figure 7:
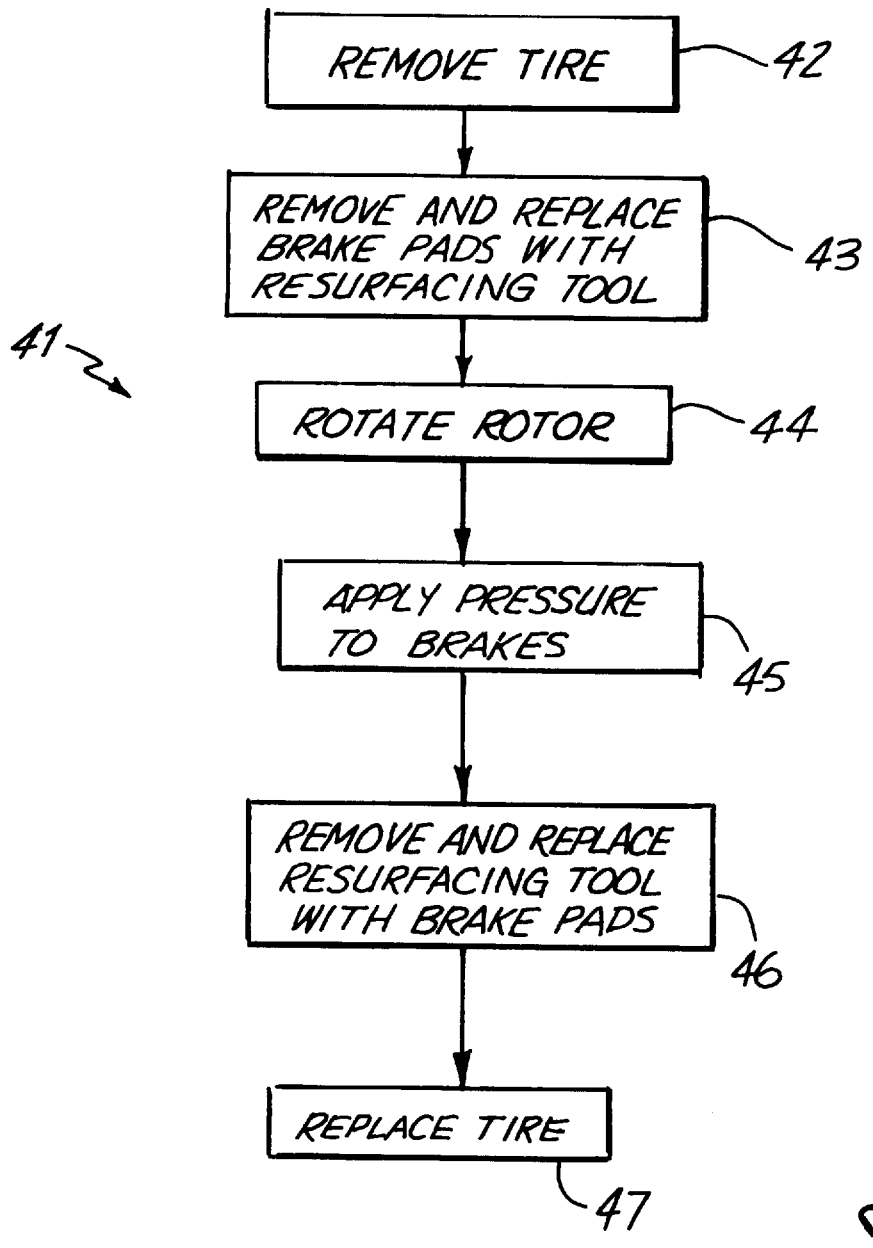
FIG. 7 is a block diagram of a method for resurfacing a braking surface of a disk brake assembly.

FIG. 7 shows a block diagram of a method 41 for resurfacing the braking surface of a rotatable brake member, which is part of a disk brake assembly, while the braking surface is mounted to a vehicle. Alternatively, method 41 may also be used to surface a braking surface of a vehicle brake assembly while the braking surface is mounted to the vehicle. Method 41 permits resurfacing of the brake assembly in less time, at a lower cost and with superior results. To resurface braking surface 34 of disk brake assembly 30, the wheel and tire of the vehicle is removed. This is represented by block 42.

Next, the braking pads of disk brake assembly 30 are removed and a resurfacing tool (resurfacers 10) is mounted to caliper brackets 36 of disk brake assembly 30 in place of the brake pads. Each resurfacer 10 is mounted to caliper brackets 36 so that abrasive surface 14 of each resurfacer 10 faces one of the opposed braking surfaces 34 of brake rotor 32. Although the resurfacing tool preferably comprises resurfacers 10 having abrasive surfaces 14, other resurfacing tools, such as those having cutting blades, such as those used in face milling, cutting teeth as those configured upon metal files, or grinding stones used in plunge grinding may also be used. This is represented by block 43.

Resurfacers 10 are brought into contact with braking surfaces 34 of the rotatable brake member, rotor 32, while braking surfaces 34 of rotor 32 are rotated. This is represented by blocks 44 and 45. The abrasive surface 14 of each resurfacer 10 is brought into contact with braking surface 34 of rotor 32 by applying pressure to the vehicle's brakes. Applying pressure to the vehicle's brakes causes caliper brackets 36 to position abrasive surfaces 14 of stationary resurfacers 10 in contact with rotating braking surfaces 34.

Braking surface 34 of rotor 32 is rotated by the vehicle itself or by an independent rotating device operably coupled to rotor 32. Preferably, the independent rotating device includes a face plate, a flex drive shaft, an appropriate speed reducer and a power source. The face plate is operably coupled to rotor 32. Power from the power source is transferred through the speed reducer and the flex drive shaft to the face plate. In this manner, the power source rotates braking surface 34 of rotor 32.

Braking surface 34 is rotated at a speed between 135 surface feet per minute and 1600 surface feet per minute. Preferably, braking surface 34 is rotated at a speed between about 330 surface feet per minute to about 1000 surface feet per minute. However, as can be appreciated, the range of speeds for rotating braking surface 34 of rotor 32 will vary according to the composition of abrasive surfaces 14 of resurfacers 10 or the type of resurfacing tool used. To prevent and remove buildup of material on abrasive surface 14 of resurfacers 10 and to extend the useful life of resurfacers 10, braking surface 34 of rotor 32 is preferably first rotated in one direction and then rotated in an opposite direction. Preferably, rotor 32 is rotated at between 10 to 30 miles per hour as indicated by vehicles speedometer for a period of 3 to 7 seconds in one direction and then rotated between 10 to 30 miles per hour for a period of 3 to 7 seconds in the opposite direction.

After a desired finish of braking surface 34 is achieved, resurfacer 10 is removed and replaced by brake pads. This is represented by block 46. The wheel and tire is then reattached to the vehicle. This is represented by block 47.

Method 41, illustrated by FIG. 7, resurfaces the braking surface of a brake rotor in less time, at a lower cost and with superior results. Because the resurfacing tool is mounted to the caliper brackets of disk brake assembly in place of the brake pads, the brake rotor does not need to be removed from the vehicle or the brake assembly. As a result, resurfacing can be done in less time and at a lower cost. Because brake rotor 32 is rotated about an axis established by the vehicle's own spindle bearing, the inherent idiosyncracies of each wheel assembly establish perpendicularities and parallelisms without tolerance. Because the resurfacing tool is mounted in place of the brake pads, the idiosyncrasies of an independent or mounted resurfacing device are not machined into the braking surface. In addition, because each wheel assembly is used to established perpendicularities and parallelisms, less adjustments and expertise are required to resurface rotor 32.

FIGS. 8 and 9 show a pair of resurfacers 20 mounted to drum brake assembly 50. FIG. 8 shows and exploded perspective view of drum brake assembly 50. FIG. 9 shows a cross-sectional view of drum brake assembly 50. Drum brake assembly 50 is well known in the art and includes brake drum 52, back plate 54, clips 56 and wheel cylinder or piston 58. Resurfacers 20 are configured for mounting to back plate 54 in place of each brake shoe. Resurfacers 20 are mounted to back plate 54 in place of the vehicle's brake shoes (not shown). Clips 56 hold resurfacers 20 against back plate 54. Piston 58 is mounted to back plate 54 and is operably coupled to resurfacers 20.

As shown by FIG. 9, resurfacers 20 are mounted to back plate 54 in place of the vehicle's brake shoes (not shown) so that abrasive surfaces 24 of resurfacers 20 face braking surface 60 of drum 52. Clips 56 secure resurfacers 20 to back plate 54. As pressure is applied to brakes of the vehicle, piston 58 of drum brake assembly 50 applies pressure to resurfacers 20 to cause abrasive surfaces 24 to contact and resurface braking surfaces 60 of drum 52.

Figure 12:
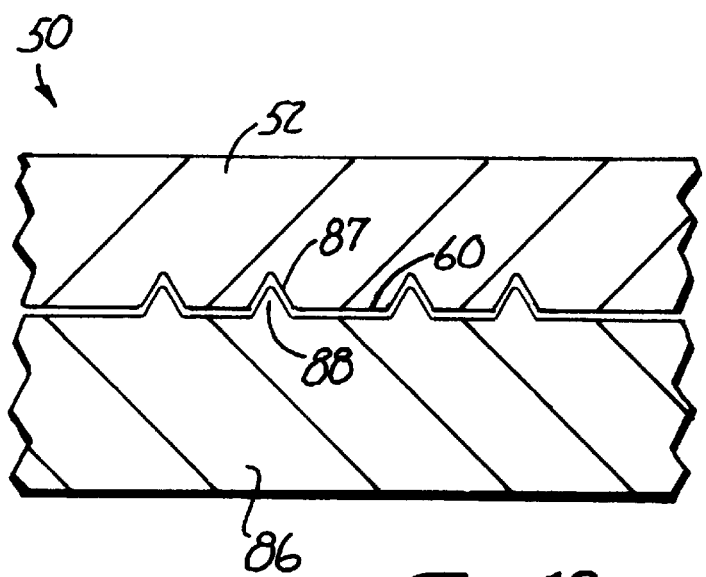
FIG. 12 is an enlarged fragmentary cross sectional view of a portion of the drum brake assembly of FIG. 9 including a brake shoe.

FIG. 12 is a greatly enlarged fragmentary cross sectional view of a portion of FIG. 9 showing brake shoe 86 repositioned in place of resurfacers 20 after braking surface 60 of drum 52 has been resurfaced. As best shown by FIG. 12, the resurfacing of braking surface 60 by resurfacers 20 (shown in FIGS. 8 and 9) creates a series of circular grooves 87 in braking surface 60 which are perfectly parallel to one another around the entire circumference of drum 52. Because resurfacers 20 (shown in FIGS. 8 and 9) remain substantially stationary with respect to drum 52 once in contact with drum 52 during the resurfacing of braking surface 60, and because the same single layer of abrasive particles resurfaces or cuts into the braking surface during each revolution of the braking surface, resurfacers 20 create perfectly parallel grooves around the circumference of drum 52.

As shown by FIG. 12, the perfectly concentric and parallel grooves 87 on braking surface 60 of drum 52 causes the brake shoes 86 to wear in, mirroring braking surface 60. As a result, peaks 88 form along brake shoe 86. Peaks 88 correspond to and perfectly match grooves 87 of braking surface 60. The perfectly matched peaks 88 and grooves 87 cause brake shoe 86 to track perfectly upon braking surface 60 of drum 52 without lateral movement or skating. Consequently, the use of resurfacer 20 ultimately results in less vibration and noise during brake operation without additional servicing procedures or products. As can be appreciated, increasing the grade of abrasive surface 24 increases the depth of each groove 87. By increasing the depth of each groove 87, the trackability of brake shoe 86 upon braking surface 60 is further increased.

In contrast, the lathe-type resurfacers and the rotating grinding stone resurfacers create non-parallel grooves or grooves which are not perpendicular to the axis of rotation of the brake drum. As a result, any peaks formed on the brake shoe are shaved away. Furthermore, the lathe-type resurfacers and the rotating grinding stone resurfacers typically produce too smooth of a surface finish for effective tracking of the brake shoe. Because any peaks formed on the brake shoe are shaved away, the brake shoe additionally polishes the braking surface. Consequently, operation of brakes which have been resurfaced with traditional lathe-type resurfacers or rotating grinding stone resurfacers encounter vibration and noise.

In addition to reducing or eliminating lateral movement or skating, grooves 87 created by resurfacer 20 also reduce braking time and reduce warping of the braking surface during brake operation. Because the flanks or sides of each groove 87 frictionally engage the flanks or sides of each corresponding peak 88 on braking shoe 86, grooves 87 increase the surface area of braking surface 60 in frictional engagement with brake shoe 86. Consequently, braking time is reduced. Furthermore, because braking surface 60 has a larger surface area exposed to air when not in contact with brake pad 86, braking surface 60 cools faster, thereby reducing warpage caused by excessive heat buildup. By reducing or eliminating warping of braking surface 60, grooves 87 reduce or eliminate vibration and noise. As can be appreciated, increasing the depth of grooves 87 (increasing the microfinish) increases the surface area of braking surface 60 to further shorten the time necessary for braking and to further reduce warping.

Lathe-type resurfacers and grinding stone resurfacers do not create concentric grooves having a sufficient depth (i.e., microfinish) to sufficiently increase the surface area of the braking surface. In direct contrast, lathe-type resurfacers and resurfacers employing grinding stones are both designed with the goal of creating a generally flat smooth or polished surface. The smooth or polished surface created by lathe-type resurfacers and grinding stones has a slower braking rate, does not cool as quickly and is more suspectable to warping and vibration.

Resurfacers 20 permit braking surface 60 of drum 52 to be resurfaced in less time, at a lower cost, and with less required expertise. Because resurfacers 20 are configured for mounting to back plate 54 in place of each brake shoe, little or no adjustment is necessary to properly position resurfacers 20. Moreover, the inherent idiosyncrasies of each wheel assembly establish perpendicularities and parallelisms without tolerance. No independent resurfacing devices or specialized mounted resurfacing devices are necessary. In addition, abrasive surfaces 24 of resurfacers 20 are held substantially stationary as abrasive surfaces 24 contact braking surfaces 60. As a result, the inherent idiosyncrasies of independent and mounted resurfacing devices are not machined into braking surface 60 of drum 52. Because braking surface 60 of drum 52 can be resurfaced in less time, at lower cost, and with very little expertise, necessary brake resurfacing will more likely be performed. Consequently, safety upon the roads will increase.

Figure 10:
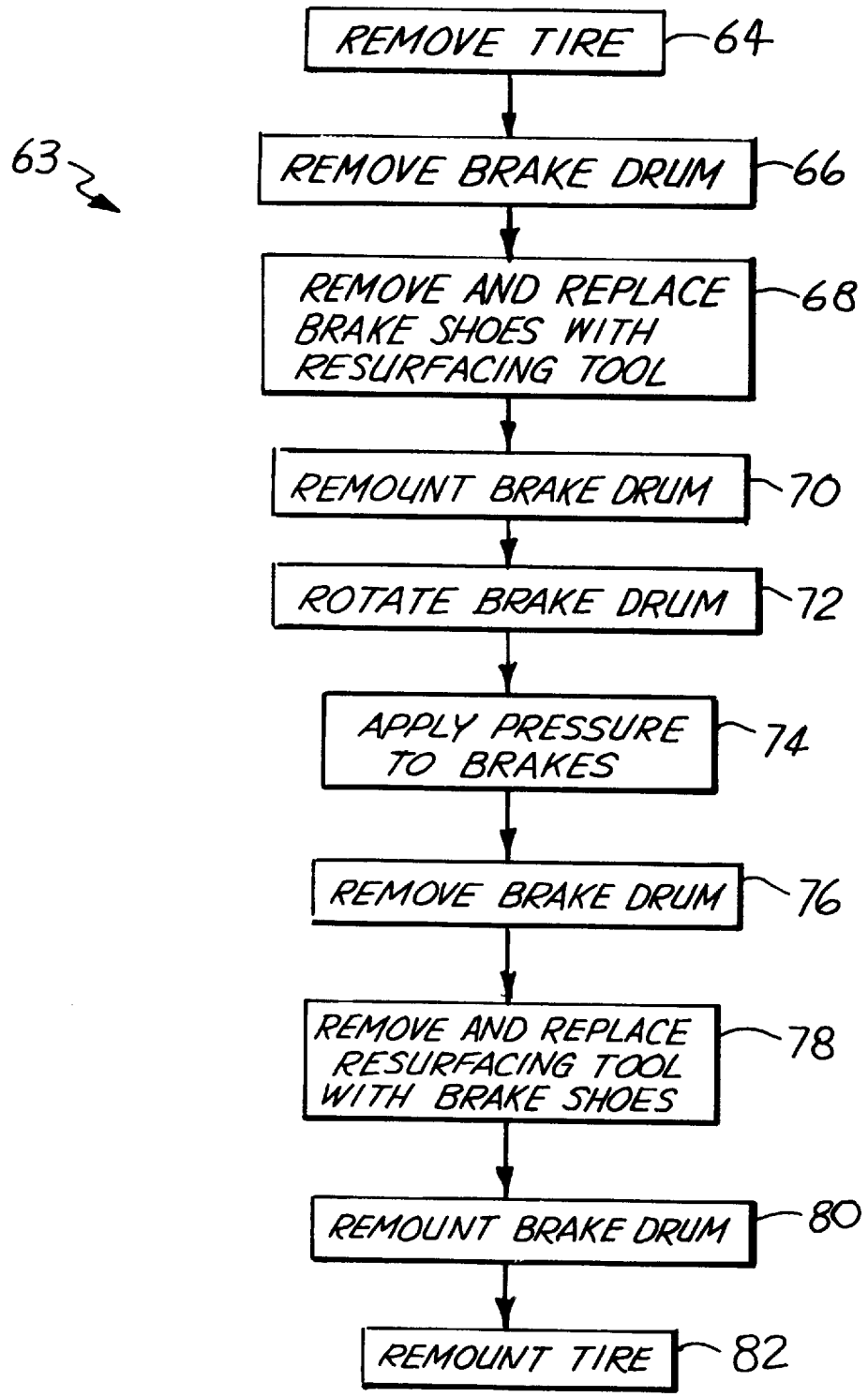
FIG. 10 is a block diagram of a method for resurfacing the braking surface of a brake drum.

FIG. 10 shows a block diagram of a method 63 for resurfacing braking surface 60 of a rotatable brake member, brake drum 52, which is part of drum brake assembly 50, while braking surface 60 is mounted to a vehicle. Alternatively, method 63 may also be used to surface a braking surface of a vehicle brake assembly while the braking surface is mounted to the vehicle. As indicated by block 64, the wheel and tire is removed to expose brake drum 52. Next, as indicated by block 66, brake drum 52 is removed to expose the brake shoes. As indicated by block 68, the brake shoes are removed and replaced with a resurfacing tool such as resurfacers 20. Alternatively, other suitable resurfacing tools such as those having cutting blades, such as those used in face milling, cutting teeth as those configured upon metal files, or grinding stones as used in plunge grinding may also be used. After resurfacers 20 are mounted to drum brake assembly 50, brake drum 52 is remounted. This is indicated by block 70.

As indicated by blocks 72 and 74, the brake drum is rotated as pressure is applied to the brakes of the vehicle to cause the resurfacing tool, resurfacers 20, to engage braking surface 60 of the rotating brake drum 52. Brake drum 52 is rotated at a speed of about 135 surface feet per minute to about 1600 surface feet per minute. Preferably, braking surface 60 is rotated at a speed between about 330 surface feet per minute to about 1000 surface feet per minute. However, as can be appreciated, the range of speeds for rotating braking surface 60 of brake drum 52 will vary according to the composition of abrasive surfaces 24 of resurfacers 20 or the type of resurfacing tool used. To prevent and remove buildup of material on abrasive surface 24 and to prolong the life of resurfacers 20, it is preferable to rotate brake drum 52 in one direction and then rotate brake drum 52 in an opposite direction. Preferably, brake drum 52 is rotated at between 10 to 30 miles per hour as indicated by the vehicles speedometer for a period of 3 to 7 seconds in one direction and then rotated between 10 to 30 miles per hour for a period of 3 to 7 seconds in the opposite direction.

Braking surface 60 of drum 52 is rotated by the vehicle itself or by an independent rotating device operably coupled to drum 52. Preferably, the independent rotating device includes a face plate, a flex drive shaft, an appropriate speed reducer and a power source. The face plate is operably coupled to drum 52. Power from the power source is transferred through the flex drive shaft and through the speed reducer to the face plate. In this way, the power source rotates braking surface 60 of drum 52.

After braking surface 60 of brake drum 52 has been sufficiently resurfaced, brake drum 52 is removed. This is indicated by block 76. The resurfacers 20 are then removed and replaced with brake shoes. This is indicated by block 78. Lastly, as indicated by blocks 80 and 82, brake drum 52 and the tire are remounted to the vehicle.

FIGS. 13 and 14 show an alternate embodiment (resurfacer 90) of brake resurfacer 14 shown in FIGS. 1 and 2. FIG. 13 shows a front elevational view of resurfacer 90. FIG. 14 shows a side elevational view of resurfacer 90 taken along lines 14—14 of FIG. 13. Resurfacer 90 includes a generally curved substrate 92 having a serrated, abrasive surface 94. Substrate 92 preferably comprises an incompressible spacing material. Alternatively, substrate 92 may consist in part of a material which compresses as brake pressure is applied during resurfacing. Substrate 92 preferably has a raised portion upon which abrasive surface 94 is formed. Substrate 92 is configured for mounting in a brake assembly in place of a movable brake member such as the brake pad and preferably has a shape similar or identical to, that of a brake pad.

Surface 94 substantially covers a front face of substrate 92. Surface 94 includes notches, grooves or serrations 96 and raised portions or intermediate plateaus 98. Serrations 96 are preferably formed by machining or cutting into the face of the raised portion of substrate 92. As a result, serrations 96 and plateaus 98 act as an integral part of substrate 92. Alternatively, substrate 92 may additionally include a backing which is adhered to the face of substrate 92 by adhesive or similar means. With this alternative, serrations 96 may be formed or cut into the backing of substrate 92. In yet another embodiment, serrations 96 may be formed in the raised portion of substrate 92 with a backing adhered to the face of the raised portion. Abrasives or other cutting material are formed on the backing. Serrations 96 are preferably oriented parallel to one another at an angle with respect to substrate 92. As can be appreciated, serrations 96 may have any of a multitude of patterns such as cross hatch, herringbone, diagonal or horizontal patterns. Serrations 96 are preferably spaced apart from one another from between about 3/16 of an inch to about 1/4 of an inch. Alternatively, serrations 96 may be spaced apart from one another from between about 1/16 of an inch to about 3/4 of an inch. Serrations 96 may have depths ranging from 1/32 of an inch up to the depth of substrate 92.

Intermediate plateaus 98 extend between serrations 96 and include abrasive material 102. Abrasive material 102 includes abrasives including ceramics, silicates, silicon carbides, aluminum oxides, carbides, diamond, cubic boron nitride synthetic diamond, and mixtures thereof. Abrasive material 102 preferably includes a mixture of ceramics and aluminum oxide. Abrasive material 102 is preferably formed as a single layer of abrasive particles upon plateaus 98. Abrasive material 102 is preferably fixedly coupled to plateaus 98 so as to remain coupled to plateaus 98 during resurfacing. Abrasive material 102 has a grade sufficient so as to produce a surface condition having concentric annular grooves with a depth of between about 150 micro-inches to about 1000 micro-inches. Abrasive material 102 preferably produces concentric grooves in the braking, surface having a depth of between about 150 micro-inches to about 400 micro-inches. FIG. 16 shows a side elevational view of resurfacer 120. Resurfacer 120 includes arcuate substrate 122 having a serrated abrasive surface 124. Substrate 122 preferably comprises an incompressible spacing material. Alternatively, substrate 122 may consist in part of a material which compresses as brake pressure is applied during resurfacing. Substrate 122 includes support member 123 and backing 125. Support member 123 is configured for mounting in a brake assembly in place of a movable brake member such as a brake shoe and preferably has a shape similar or identical to that of a brake shoe.

Backing 125 consists of a thin supporting material having an outer surface paralleling the outer surface of support member 123. Backing 125 underlies and supports serrated, abrasive surface 124. Backing 125 preferably consists of a cloth or rigid fiber board backing. Alternatively, other materials for backing 125 may be used. The front face of backing 125 supports surface 124 while the back face of backing 125 is fixedly secured to support member 123 of substrate 122 by adhesive or other known attachment methods.

Surface 124 substantially covers an arcuate surface of substrate 122 and includes notches, grooves, or serrations 126 and intermediate raised portions or plateaus 128. Serrations 126 are preferably formed by machining or cutting into the front face of backing 125. Serrations 126 are oriented in a herringbone pattern across substrate 122. As can be appreciated, serrations 126 may have any of a multitude of patterns such as cross hatch, herringbone, diagonal or horizontal patterns. Similar to serrations 96 of FIGS. 13 and 14, serrations 126 are preferably spaced apart from one another between about 3/16 of an inch to about 1/4 of an inch. Alternatively, serrations 126 may be spaced apart from between about 1/16 of an inch to about 3/4 of an inch. Serrations 126 may have a depth from between about 1/32 of an inch up to the depth of backing 123. Because serrations 126 are preferably cut into a surface of backing 125, backing 125, which supports surface 124, may be secured to the existing brake shoe of the vehicle brake assembly. As can be appreciated, serrations 126 may be directly cut into support member 123 with an abrasive or cutting material applied to support member 123 between serrations 126. In addition, abrasive surface 124 may also be formed by cutting serrations directly into the surface of support member 123 and applying a backing carrying abrasive material 132 to support member 123.

Intermediate plateaus 128 extend between serrations 126 and include abrasive material 132 which covers plateaus 128. Abrasive material 132 comprises ceramics, silicates, silicon carbides, aluminum oxides, carbides, diamond, synthetic diamond, cubic boron nitride and mixtures thereof. Abrasive material 132 preferably includes a mixture of ceramics and aluminum oxide. Abrasive material 132 is preferably formed as a single layer of abrasive particles upon plateaus 128. Abrasive material 132 is preferably fixedly coupled to plateaus 128 so as to remain coupled to plateau 98 during resurfacing. Abrasive material 132 has a grade sufficient so as to produce a surface condition of concentric annular grooves having a depth of between about 150 micro-inches and about 1000 micro-inches. Abrasive material 132 preferably produces concentric grooves in the braking surface having a depth of between about 150 micro-inches to about 400 micro-inches.

Because surface 124 includes serrations 126, only plateaued portions surface 124 contact the braking surface to be resurfaced. Only plateaus 128 of surface 124 forcefully contact the braking surface. Because a smaller portion of surface 124 comes into contact with the braking surface, forces applied by the braking assembly during resurfacing are distributed over a smaller surface area, namely plateaus 128. As a result, plateaus 128 act as pressure points which apply a greater force per surface area to the braking surface. Consequently, brake surface material is more effectively removed by abrasive material 132 carried upon plateaus 128 of surface 124. Surface 124 is preferably of concentric annular grooves having a depth of between about 150 micro-inches and about 1000 micro-inches. Abrasive material 132 preferably produces concentric grooves in the braking surface having a depth of between about 150 micro-inches to about 400 micro-inches.

Because surface 124 includes serrations 126, only plateaued portions surface 124 contact the braking surface to be resurfaced. Only plateaus 128 of surface 124 forcefully contact the braking surface. Because a smaller portion of surface 124 comes into contact with the braking surface, forces applied by the braking assembly during resurfacing are distributed over a smaller surface area, namely plateaus 128. As a result, plateaus 128 act as pressure points which apply a greater force per surface area to the braking surface. Consequently, brake surface material is more effectively removed by abrasive material 132 carried upon plateaus 128 of surface 124. Surface 124 is preferably durable so as to be capable of removing up to 0.125 inches of brake surface material.

FIGS. 17 and 18 show an alternate embodiment (resurfacer 140) of brake resurfacer 90 shown in FIGS. 13 and 14. FIG. 17 shows a front elevational view of resurfacer 140. FIG. 18 shows a side elevational view of resurfacer 140. Resurfacer 140 is similar to resurfacer 90 except that abrasive surface 94 is replaced with abrasive surface 144. For sake of illustration, those elements of resurfacer 140 which are similar to those elements of resurfacer 90 are numbered similarly. Abrasive surface 144 substantially covers a front face of substrate 92. Surface 144 includes a series of dimples 146 which cover the front face of substrate 92 and raised portions or plateaus 148.

Dimples 146 are preferably formed by puncturing or indenting the face of substrate 92. Alternatively, dimples 146 may be formed by selectively applying abrasive material 150 only to certain regions on the face of substrate 92 so that dimples or depressions are formed between the areas where abrasives are applied. Dimples 146 define plateaus 148 which extend between dimples 146. Dimples 146 preferably comprise circular depressions extending into the face of substrate 92. Dimples 146 are preferably spaced apart from one another from between about 3/16 of an inch to about 1/4 of an inch. In the alternative, dimples 146 may be spaced apart from one another from between about 1/16 of an inch to about 3/4 of an inch. Dimples 146 have a depth from between about 1/32 of an inch up to the depth of substrate 92. Dimples 146 are preferably oriented in a random pattern across the face of substrate 92. As can be appreciated, dimples 146 may be dispersed in any of a multitude of patterns. Moreover, dimples 146 may also have any of a multitude of shapes including triangular or rectangular shaped depressions. Because dimples 146 preferably extend into the face of substrate 92, dimples 146 act as an integral part of substrate 92. Alternatively, substrate 92 may additionally include a backing which is adhered to the face of substrate 92 by adhesive or similar means. With this alternative, dimples 146 are formed on the backing. As yet another alternative, dimples 146 may be formed directly into the raised portion of substrate 92 with an abrasive covered backing applied or mounted upon the raised portion.

Plateaus 148 extend between dimples 146 and include abrasive material 150 covering the face of substrate 92. Abrasive material 150 comprises abrasives including ceramics, silicates, silicon carbides, aluminum oxides, carbides, diamond, synthetic diamond cubic boron nitride and mixtures thereof. Abrasive material 150 preferably comprises a mixture of ceramics and aluminum oxide. Abrasive material 150 is preferably formed as a single layer of abrasive particles upon plateaus 148. Abrasive material 150 has a grade sufficient so as to produce a surface condition of concentric annular grooves having a depth of between about 150 micro-inches and about 1000 micro-inches. Abrasive material 150 preferably produces concentric grooves in the braking surface having a depth of between about 150 micro-inches to about 400 micro-inches.

Because surface 144 includes dimples 146, only plateaus 148 of surface 144 forcefully contact the braking surface. Because a smaller portion of surface 144 comes into contact with the braking surface, forces applied by the braking assembly during resurfacing are distributed over a smaller surface area, namely plateaus 148. As a result, plateaus 148 act as pressure points which apply the greater force per surface area to the braking surface. Consequently, brake surface material is more effectively removed by abrasive material 150 carried upon plateaus 148 of surface 144. Abrasive surface 144 is preferably durable so as to be capable of removing up to 0.125 inches of brake surface material.

FIGS. 19 and 20 illustrate an alternate embodiment (resurfacer 160) of brake resurfacer 120 shown in FIGS. 15 and 16. FIG. 19 shows a front elevational view of resurfacer 160. FIG. 20 shows a side elevational view of resurfacer 160 taken along lines 20—20 of FIG. 19. Resurfacer 160 is similar to resurfacer 120 except that surface 124 is replaced with surface 164. For the sake of illustration, those elements of resurfacer 160 which are similar to those elements of resurfacer 120 are numbered similarly. Abrasive surface 164 substantially covers a front face of substrate 122. Surface 164 includes a series of dimples 166 and raised portions or plateaus 168 which are formed on backing 125. Dimples 166 are preferably formed by puncturing or indenting the front face of backing 125. Alternatively, dimples 166 may be formed by selectively applying abrasive material 170 only to certain regions on the front face of backing 125 so that dimples or depressions are formed between the areas where abrasives are applied. Dimples 166 define plateaus 168 which extend between dimples 166. Dimples 166 preferably comprise circular depressions extending into the front face of backing 125. Dimples 166 are preferably spaced apart from one another from between about 3/16 of an inch to about 1/4 of an inch. In the alterative, dimples 166 may be spaced apart from one another from between about 1/16 of an inch to about 3/4 of an inch. Dimples 166 have a depth from between about 1/32 of an inch up to the depth of backing 125.

Because dimples 166 preferably extend into a face of backing 125, backing 125, supporting abrasive surface 164, may be affixed to the existing brake shoe of the vehicle brake assembly. Alternatively, in lieu of backing 125, dimples 166 may be formed directly on or into support member 123 with an abrasive material applied to or formed on support member 123 between dimples 166. As yet another alternative, dimples 166 may be formed directly on or into support member 123 with non-dimpled, abrasive covered backing mounted upon support member 123.

Dimples 166 are preferably oriented in a random pattern across the front face of backing 125. As can be appreciated, dimples 166 may be disbursed in any of a multitude of patterns. Moreover, dimples 166 may also have any of a multitude of shapes including triangular or rectangular shaped depressions.

Plateaus 168 extend between dimples 166 and include abrasive material 170. Abrasive material 170 includes ceramics, silicates, silicon carbides, aluminum oxides, carbides, diamond, synthetic diamond, cubic boron nitride and mixtures thereof. Preferably, abrasive material 170 comprises a mixture of ceramics and aluminum oxide. Abrasive material 170 is preferably formed as a single layer of abrasive particles upon plateaus 168. Abrasive material 170 has a grade sufficient so as to produce a surface condition of concentric annular grooves having a depth of between about 150 micro-inches and about 1000 micro-inches. Abrasive material 170 preferably produces concentric grooves in the braking surface having a depth of between about 150 micro-inches to about 400 micro-inches.

Because surface 164 includes dimples 166, only plateaus 168 of surface 164 forcefully contact the braking surface. Because a smaller portion of surface 164 comes into contact with the braking surface, forces applied by the braking assembly during resurfacing are distributed over a smaller surface area, namely plateaus 168. As a result, plateaus 168 act as pressure points which apply the greater force per surface area to the braking surface. Consequently, brake surface material is more effectively removed by abrasive material 170 carried upon plateaus 168 of surface 164. Abrasive surface 164 is preferably durable so as to be capable of removing up to 0.125 inches of brake surface material.

FIGS. 21 and 22 show an alternate embodiment (resurfacer 180) of brake resurfacer 10 shown in FIGS. 1 and 2. FIG. 21 shows a front elevational view of resurfacer 180. FIG. 22 shows a side elevational view of resurfacer 180 taken along lines 22—22 of FIG. 21. Resurfacer 180 includes a generally curved substrate 182 having a cutting surface 184. Substrate 182 preferably comprises an incompressible spacing material. Alternatively, substrate 92 may consist in part of a material which compresses as brake pressure is applied during resurfacing. Substrate 182 preferably has a raised portion upon which cutting surface 184 is formed. Substrate 182 is configured for mounting in a brake assembly in place of a moveable brake member such as the brake pad and preferably has a shape similar or identical to that of a brake pad. Surface 184 substantially covers a front face of substrate 182.

Surface 184 includes cutting teeth 188. Cutting teeth 188 are preferably formed by machining or cutting serrations into the face of the raised portion of substrate 182. Teeth 188 are preferably formed from high speed steel as is conventionally known in the art. Cutting teeth 188 are preferably oriented parallel to one another at an angle with respect to substrate 182. As can be appreciated, cutting teeth 188 may have any of a multitude of patterns such as herringbone, diagonal or horizontal patterns.

As is conventionally known in the art of face milling, cutting teeth 188 are preferably designed to have attack or rake angles, primary relief angles and secondary relief angles. The attack or rake angles engage the surface of the member to be resurfaced, provide chip clearance and define a cutting edge 190. The primary and secondary relief angles increase the strength of cutting teeth 188. The secondary relief angles permit braking surface material cut by teeth 188 to be dislodged away from teeth 188. Cutting edge 190 is preferably coated with an abrasive or mineral 192 such as diamond to create parallel and concentric grooves in the braking surface and to extend tool life of teeth 188. As a result, teeth 188 cut and remove brake surface material to resurface the braking surface. Teeth 188 of surface 184 are preferably durable so as to be capable of removing up to 0.0125 inches of brake surface material.

FIGS. 23 and 24 show an alternate embodiment (resurfacer 200) of brake resurfacer 20 shown in FIGS. 1 and 2. FIG. 23 shows a front elevational view of resurfacer 200. FIG. 24 shows a side elevational view of resurfacer 200 taken along lines 24—24 of FIG. 23. Resurfacer 200 includes arcuate substrate 202 having a toothed, cutting surface 204. Substrate 202 preferably comprises an incompressible spacing material. Alternatively, substrate 202 may consist in part of a material which compresses as brake pressure is applied during resurfacing. Substrate 202 is configured for mounting in a brake assembly in place of a moveable brake member such as a brake shoe and preferably has a shape similar or identical to that of a brake shoe.

Cutting surface 204 substantially covers an arcuate surface of substrate 202 and includes cutting teeth 208. Cutting teeth 208 are preferably formed by machining or cutting serrations into the front face substrate 202. Cutting teeth 208 are preferably formed from high speed steel as is conventionally known in the art. Cutting teeth 208 are similar to cutting teeth 188 shown in FIGS. 21 and 22 except that cutting teeth 208 are oriented in a herringbone pattern across substrate 202. As can be appreciated, teeth 208 may have any of a multitude of patterns such as diagonal or horizontal patterns.

As is conventionally known in the art of face milling, cutting teeth 208 preferably include attack or rake angles, primary relief angles and secondary relief angles. Rake angles engage the surface of the member to be resurfaced, provide chip clearance and define a cutting edge 210. The primary and secondary relief angles provide increased strength for cutting teeth 208. The secondary relief angles permit braking surface material cut by cutting teeth 208 to be dislodged and removed away from cutting teeth 208. Cutting edge 210 is preferably coated with an abrasive or mineral 212 such as diamond to create parallel and concentric grooves in the braking surface and to extend tool life of teeth 208. As a result, teeth 208 cut and remove brake surface material to resurface the braking surface. Teeth 208 of cutting surface 204 are preferably durable so as to be capable or removing up to 0.125 inches of brake surface material.

Figure 25:
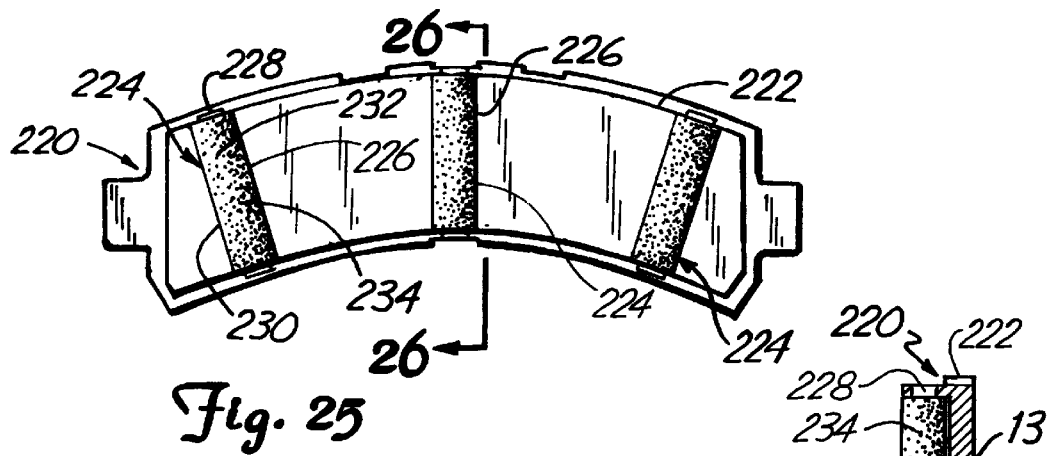
FIG. 25 is a front elevational view of an alternate embodiment of the brake resurfacer of FIG. 1.
Figure 26:
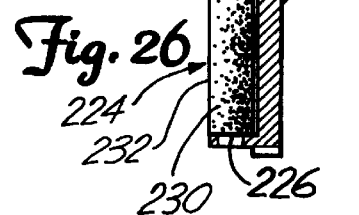
FIG. 26 is a cross-sectional view of the brake resurfacer of FIG. 25.

FIGS. 25 and 26 show an alternate embodiment (resurfacer 220) of brake resurfacer 10 shown in FIGS. 1 and 2. FIG. 25 shows a front elevational view of resurfacer 220. FIG. 26 shows a cross-sectional view of resurfacer 220 taken along lines 26—26 of FIG. 25. Resurfacer 220 includes a generally curved substrate 222 and roller pins 224. Substrate 222 is similar to substrate 12 of FIGS. 1 and 2 except that substrate 222 includes semi-cylindrical shaped grooves 226 in place of backing 15. Grooves 226 extend part way into support member 13 and are configured for rotatably receiving roller pins 224. Roller pins 224 and grooves 226 are preferably centered with respect to the center line of the axis of rotation of the braking surface. Alternatively, to increase removal rates of the brake surface material by resurfacer 220, roller pins 224 and grooves 226 may be canted with respect to the center line of the axis of rotation of the braking surface. As the angle or cant is increased, skidding forces between roller pins 224 and the braking surface are also increased to raise the brake surface material removal rate of resurfacer 220. Roller pins 224 rotatably mount within grooves 226 and include bearings 228 and rollers 230 having contact surfaces 232. Bearings 228 comprise standard bearing assemblies as are conventionally known. Bearings 228 are positioned at opposite ends of rollers 230. Bearings 228 rotatably couple rollers 230 of roller pins 224 partially within grooves 226 of substrate 222 so that contact surfaces 232 partially project out of grooves 226 to contact the braking surface during resurfacing.

Rollers 230 generally consist of cylindrical shaped pins which rotate about bearings 228 within grooves 226. Rollers 230 are supported by bearings 228 so that contact surface 232 of each roller 230 projects at least partially above groove 226 and so that contact surface 232 does not contact groove 226. Contact surfaces 232 extend around an outer surface of rollers 230 and preferably include abrasives 234. Abrasives 234 preferably include ceramics, silicon carbides, aluminum oxides, carbides, diamond, synthetic diamond, cubic boron nitride and mixtures thereof. Contact surfaces 232 of roller pins 224 are preferably durable so as to be capable of removing up to 0.125 inches of brake surface material.

During resurfacing, rollers 230 contact the braking surface and rotate at the same speed as the braking surface. As contact surface 232 of each roller 230 contacts the braking surface, abrasives 234 crush the braking surface material and remove the braking surface material to resurface the braking surface. Although three roller pins 224 are shown for purposes of illustration, resurfacer 220 may alternatively include as many roller pins as are necessary for resurfacing. Because each roller pin 224 may be manufactured separately from substrate 220 and because each roller pin 224 is individually mounted to substrate 222, worn or damaged roller pins 224 may be easily and inexpensively replaced without replacing substrate 222. In addition, roller pins 224 having different grades or removal capabilities may also be mounted upon the same substrate 222. Consequently, resurfacer 220 is less expensive and is more adaptable to various resurfacing requirements.

Figure 27:
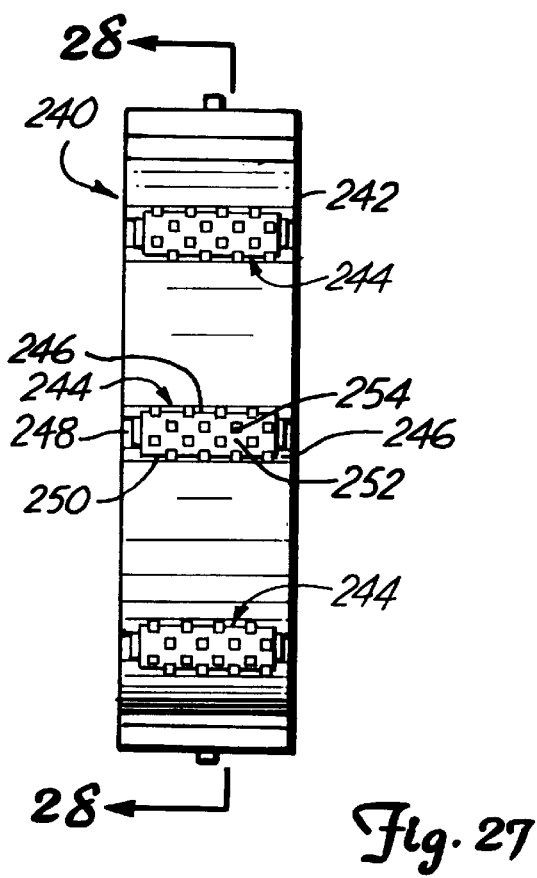
FIG. 27 is a front elevational view of an alternate embodiment of the brake resurfacer of FIG. 3.
Figure 28:
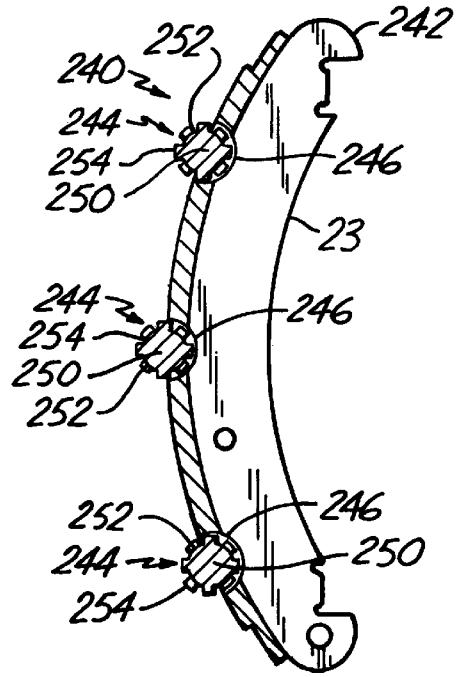
FIG. 28 is a cross-sectional view of the brake resurfacer of FIG. 27.

FIGS. 27 and 28 show an alternate embodiment (resurfacer 240) of brake resurfacer 20 shown in FIGS. 3 and 4. FIG. 27 shows a front elevational view of resurfacer 240. FIG. 28 shows a cross sectional view of resurfacer 240 taken along lines 28—28 of FIG. 27. Resurfacer 240 includes arcuate substrate 242 and roller pins 244. Substrate 242 is similar to substrate 22 of FIGS. 3 and 4 except that substrate 242 includes semi-cylindrical shaped grooves 246 in place of backing 25. Grooves 246 extend part way into support member 23 and are configured for rotatably receiving roller pins 244.

Roller pins 244 rotatably mount within grooves 246 and include bearings 248 and rollers 250 having contact surfaces 252. Bearings 248 comprise standard bearing assemblies as are conventionally known. Bearings 248 are positioned at opposite ends of rollers 250. Bearings 248 rotatably couple rollers 250 of roller pins 244 partially within grooves 246 of substrate 242 so that contact surfaces 252 partially project out of grooves 246 to contact the braking surface during resurfacing.

Rollers 250 generally consist of cylindrical shaped pins which rotate about bearings 248 within grooves 246. Rollers 250 are supported by bearings 248 so that contact surface 252 of each roller 250 projects at least partially above groove 246 and so that contact surface 252 does not contact groove 246. Contact surfaces 252 extend around an outer surface of rollers 250 and preferably include tines 254. Tines 254 consists of short fingers or teeth which project from rollers 250. Tines 254 are preferably integrally formed as part of rollers 250 from carbon steels, high-speed steels and cemented carbides. Contact surfaces 252 of roller pins 250 are preferably durable so as to be capable of removing up to 0.125 inches of brake surface material.

During resurfacing, rollers 250 contact the braking surface and rotate at the same speed as the braking surface. As contact surface 252 of each roller 250 contacts a braking surface, tines 254 are pressed or forced into the braking surface material to crush and remove braking surface material to resurface the braking surface. Although three roller pins 244 are shown for purposes of illustration, resurfacer 240 may alternatively include as many roller pins as are necessary for resurfacing. Because each roller pin 240 may be manufactured separately from substrate 242 and because each roller pin 244 is individually mounted to substrate 242, worn or damaged roller pins 244 may be easily and inexpensively replaced without replacing substrate 242. In addition, roller pins 244 having different grades or removal capabilities may also be mounted upon the same substrate 242. Consequently, resurfacer 240 is less expensive and is more adaptable to various resurfacing requirements. As can be appreciated, roller pins 244 may be used in conjunction with substrate 222 of FIGS. 25 and 26 while roller pins 224 may be used in conjunction with substrate 242 of FIGS. 27 and 28.

Figure 29:
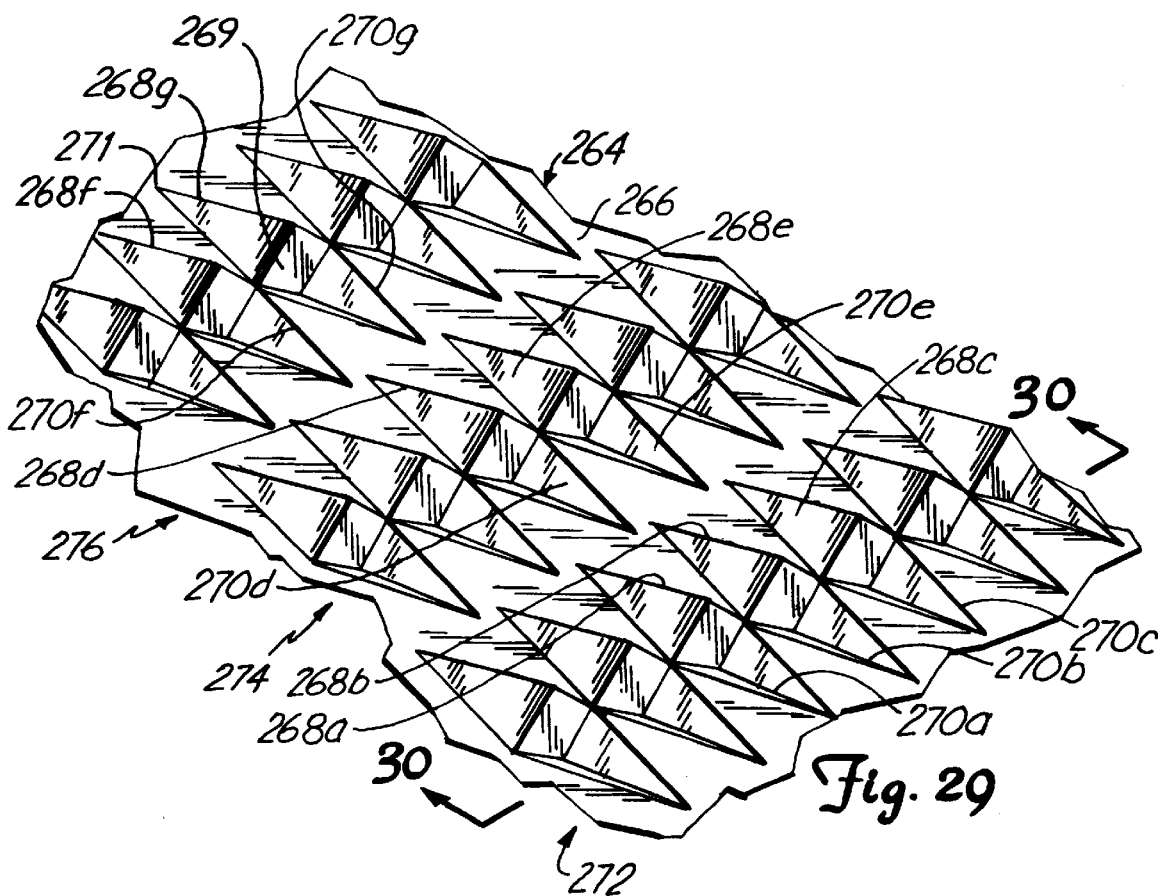
FIG. 29 is a fragmentary perspective view of a cutting surface.
Figure 30:
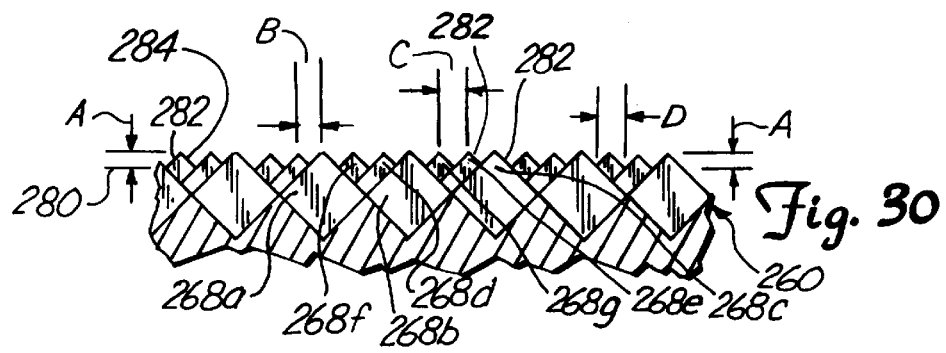
FIG. 30 is a fragmentary cross-sectional view of the cutting surface of FIG. 29.

FIGS. 29 and 30 show an alternate embodiment (cutting surface 264) of abrasive surfaces 14 and 24 of FIGS. 1–4 and cutting surfaces 184 and 204 of FIGS. 21–24. FIG. 29 is a greatly enlarged fragmentary perspective view of cutting surface 264. FIG. 30 is a greatly enlarged fragmentary cross-sectional view of cutting surface 264 taken along lines 30—30 of FIG. 29. Cutting surface 264 is preferably formed on a backing affixed to a support member (as shown in FIGS. 1–4) or formed directly into and integral with a support member (as shown in FIGS. 21–24). Cutting surface 264 includes a base or supporting surface 266, a plurality of cutting teeth 268, for example, teeth 268a–268g, and a plurality of depressions or chip spaces 270, for example, chip spaces 270a–270g. Each cutting tooth 268 is generally cone-shaped and includes cutting face 269. Each cutting tooth 268 projects upward from supporting surface 266 in a forward longitudinal direction opposite to the direction of movement of the braking surface to be resurfaced. For example, cutting tooth 268g projects upward from surface 266 beginning at point 271 and terminating at cutting face 269. Each cutting face 269 preferably forms an acute angle with respect to supporting surface 266. Cutting teeth 268 are preferably formed in rows 272, 274 and 276 extending laterally across supporting surface 266. Each adjacent set of rows, for example, rows 272 and 274, and rows 274 and 276, are laterally offset from one another so that cutting teeth 268*a*, 268*b*, and 268*c* of row 272 are laterally offset from teeth 268*d* and 268*e* of row 274 while teeth 268*f* and 268*g* are laterally offset from teeth 268*d* and 268*e*. Because cutting teeth 268*d* and 268*e* are positioned rearward of and are laterally offset from cutting teeth 268*a*, 268*b* and 268*c*, and because cutting teeth 268*f* and 268*g* are positioned rearward of and are laterally offset from cutting teeth 268*d* and 268*e*, cutting teeth 268 establish a composite cutting plane having groove-forming peaks as best shown in FIG. 30. Alternatively, cutting teeth 268 may be formed on supporting surface 266 in a variety of configurations so that a composite cutting plane is created across cutting surface 264.

Chip spaces 270*a*–270*g* are conical shaped notches positioned in front of each respective cutting tooth 268*a*–268*g*. Chip spaces 270 extend into supporting surface 266 and preferably have a depth sufficient for receiving chips of braking surface material removed by cutting teeth 268. Chip spaces 270 collect removed braking surface material so that material does not build up in front of cutting faces 269 of teeth 268. As a result, chip spaces 270 enable teeth 268 to more efficiently remove braking surface material during resurfacing.

As best shown by FIG. 30, forward rows and rearward rows of cutting teeth 268 are laterally offset from one another to form a composite cutting plane 280 and cutting peaks 282. Cutting plane 280 is the horizontal plane above supporting surface 266 defined by points or locations where forward and rearward cutting teeth 268 intersect one another. The depth or location of cutting plane 280 is determined by the degree of offset between the rows of teeth and the slope of each tooth. Cutting plane 280 is the horizontal plane across cutting surface 264 where cutting surface 264 removes an equal amount of braking surface material laterally across the braking surface. Cutting plane 280 performs the same function as an elongated cutting blade extending laterally across cutting surface 264.

Cutting peaks 282 are the upper-most portions of faces 269 which extend above cutting plane 280. Cutting peaks 282 are preferably V-shaped and extend above cutting plane 280 by a distance or height A. As a result, cutting peaks 282 cut and create corresponding grooves in the braking surface having a depth approximately equal to A. Alternatively, cutting peaks 282 may have a variety of shapes, including round or beveled peaks or any generally pointed configuration. Because cutting surface 264 remains substantially stationary during rotation of the braking surface, the grooves created in the braking surface by cutting peaks 282 are perfectly concentric with respect to adjacent grooves across the braking surface. As the brake pads, brake drums or other contact surfaces of a movable brake member engage the resurfaced braking surface, the pads, shoes or contact surface mirrors the braking surface to create tracking peaks on the pads, shoes or contact surface. These tracking peaks correspond to and perfectly match the grooves cut into the braking surface. The perfectly matched tracking peaks track within the grooves to cause the brake pad, the brake shoe, or the contact surface of the moveable brake member to track perfectly upon the braking surface without lateral movement or skating, resulting in less vibration and noise during brake operation without additional resurfacing procedures or products.

Cutting surface 264 cuts grooves into the braking surface which have a known and controllable frequency or spacing and depth. As shown in FIG. 30, row 272 of cutting teeth 268 is laterally offset by a distance B from row 274 of cutting teeth 268. Similarly, row 274 is laterally offset from row 276 by distance C. Preferably, the distance or degree of offset between each adjacent row of teeth 268 is equal. However, as can be appreciated, the degree of offset between rows may also be varied from one row of teeth to another. In the preferred embodiment of FIGS. 29 and 30, the degree of offset between rows 272 and 274, distance B, is equal to the degree of offset between rows 274 and 276, distance C. As a result, grooves formed within the braking surface by cutting peaks 282 will also be equally spaced from one another. In addition, because rows 272, 274 and 276 are offset from one another by distances B and C, respectively, and because each cutting peak 282 has a slope 284, cutting peaks 282 have a height A and a width D. Consequently, each peak forms a corresponding groove having a depth D and a width A. As can be appreciated, by varying the distance or degree of offset between adjacent rows of teeth 268 and the slope of each peak 282, the spacing or frequency of grooves, the width and the depth of the grooves may be controlled and varied as desired.

In addition to enabling one to precisely control the depth, width and spacing of the grooves formed in the braking surface, cutting surface 264 has a longer useful life, therefore lowering the cost of resurfacing. Because cutting peaks 282 are formed from the relatively wear resistant material such as high speed steel or carbide and may be coated with minerals such as diamond, cutting peaks 282 do not wear or become polished as quickly. Thus, cutting surface 264 has a longer life and is capable of resurfacing a greater number of braking surfaces.

The resurfacing method and apparatus of the present invention resurfaces the braking of a vehicle brake assembly is less time, at a lower cost, and with less required expertise. Because the braking surface is resurfaced while the braking surface is still mounted to the vehicle, the braking surface of the rotor or drum does not need to be dismounted from the vehicle and secured to an independent resurfacing device. As a result, less time is required to resurface the braking surface of the rotor or drum. Because the braking surface of the rotor or drum is rotated about an axis established by the vehicle's own spindle bearing and is contacted by a stationary abrasive surface, the inherent idiosyncracies of each wheel assembly establish ideal perpendicularities and parallelism on the braking surface. Moreover, the inherent idiosyncrasies of independent or mounted resurfacing devices are not machined into the braking surface.

Because resurfacing the braking surface does not require an independent machine and because no alignment of the resurfacing device is necessary, the braking surface can be resurfaced with less expertise and at a lower cost. Furthermore, because resurfacing the braking surface forms microscopic grooves in the braking surface which are concentric to one another and to the axis of rotation of the braking surface, lateral movement of the brake pads or brake shoes is minimized and vibration is reduced during brake operation.

Although the present invention has a variety of applications, the present invention is particularly advantageous in the context of vehicle brakes. As can be appreciated, the present invention has applications with consumer vehicle brakes, commercial vehicle brakes and aircraft brakes. Moreover, the present invention may be employed with any industrial application or design where a friction surface of a movable member is brought into contact with another rotating or stationary surface, such as clutches, brake bands, and the like.

Although the present invention has been described with reference to preferred embodiments, workers skilled in the art will recognize that changes may be made in form and detail without departing from the spirit and scope of the invention.

What is claimed is:

1. A brake resurfacer for resurfacing a braking surface of a vehicle brake assembly while the braking surface is mounted to a vehicle, wherein the brake assembly includes a movable brake member which is movable between a first position and a second position and wherein the movable brake member is in engagement with the braking surface in the first position and is out of engagement with the braking surface in the second position, the resurfacer comprising:

an abrasive member constructed and arranged to remove material from the braking surface to resurface the braking surface, the abrasive member including a plurality of abrasive bands individually separated by a respective plurality of recessed bands of non-abrasive material each of the recessed bands being spaced apart from each other in a range from about 1/16 of an inch to about 3/4 of an inch and each of the abrasive bands comprising abrasive material having a grade sufficient to produce a surface finish of 150–1000 microfinish:

a backing having a front and rear surface, the backing supporting the abrasive member on the front surface, and including a pressure sensitive adhesive on the rear surface releasably supporting the abrasive member on the movable brake member; and the abrasive bands being movable into contact with the braking surface to resurface the braking surface when the movable brake member is moved near the first position.

2. The resurfacer of claim 1, wherein:

the pressure sensitive adhesive includes an adhesive having high shear strength and low pull strength such that the backing is securely adhered to the movable brake member while the movable brake member is in the first position and is removable from the moveable brake member when the movable brake member is in the second position.

3. The resurfacer of claim 1, wherein the braking surface comprises a rotor, wherein the movable brake member comprises a brake pad and wherein the backing is configured for being mounted on the brake pad.

4. The resurfacer of claim 1, wherein the braking surface comprises a brake drum, wherein the movable brake member comprises a brake shoe and wherein the backing is configured for mounting on the brake shoe.

5. The resurfacer of claim 1, wherein the recessed bands are in a herringbone pattern.

6. The resurfacer of claim 1, wherein the recessed bands are in a diagonal pattern.

7. The resurfacer of claim 1, wherein each of the recessed bands are spaced apart from each other in a range from about 3/16 of an inch to about 1/4 of an inch.

8. The resurfaces of claim 1, wherein the recessed bands are parallel to each other.

* * * * *